(12) United States Patent
Fairchild et al.

(10) Patent No.: US 10,674,123 B2
(45) Date of Patent: Jun. 2, 2020

(54) LARGE DISPLAY SYSTEMS WITH SCREEN TENSION ADJUSTABILITY

(71) Applicant: Prysm, Inc., San Jose, CA (US)

(72) Inventors: Scot C. Fairchild, Santa Clara, CA (US); David E. Weldon, Santa Clara, CA (US)

(73) Assignee: Prysm, Inc., San Jose, CA (US)

( * ) Notice: Subject to any disclaimer, the term of this patent is extended or adjusted under 35 U.S.C. 154(b) by 0 days.

(21) Appl. No.: 16/103,239

(22) Filed: Aug. 14, 2018

(65) Prior Publication Data
US 2019/0007663 A1 Jan. 3, 2019

Related U.S. Application Data

(63) Continuation of application No. 15/383,988, filed on Dec. 19, 2016, now Pat. No. 10,063,817.

(51) Int. Cl.
*H04N 9/31* (2006.01)
*G03B 21/58* (2014.01)

(52) U.S. Cl.
CPC .......... *H04N 9/3141* (2013.01); *G03B 21/58* (2013.01); *H04N 9/3129* (2013.01); *H04N 9/3147* (2013.01)

(58) Field of Classification Search
CPC ........ G03B 21/58; G03B 21/56; G03B 21/60; H04N 9/31
See application file for complete search history.

(56) References Cited

U.S. PATENT DOCUMENTS

| | | | | |
|---|---|---|---|---|
| 4,580,361 A | * | 4/1986 | Hillstrom | B60R 13/00 160/378 |
| 4,927,238 A | * | 5/1990 | Green | G02B 27/2214 352/86 |
| 5,363,149 A | * | 11/1994 | Furuno | G03B 21/10 312/7.2 |
| 5,548,350 A | * | 8/1996 | Yamada | G03B 21/02 348/789 |
| 5,818,639 A | * | 10/1998 | Furuya | G03B 21/10 359/455 |
| 2006/0221021 A1 | * | 10/2006 | Hajjar | G03B 21/567 345/84 |
| 2007/0153375 A1 | | 7/2007 | Peterson | |

* cited by examiner

*Primary Examiner* — Isiaka O Akanbi
*Assistant Examiner* — Danell L Owens
(74) *Attorney, Agent, or Firm* — Fish & Richardson P.C.

(57) ABSTRACT

Large format display systems are described that are reconfigurable between an open configuration designed for performing maintenance on the system and a closed configuration designed for normal operations of the display system. In the closed configuration, the display screen is intentionally subjected to a substantial amount of tensile force to advantageously stabilize the display screen. That substantial tensile force is generated by a sturdy stationary frame that the display screen is anchored against in the closed configuration. When the display system is reconfigured to the open configuration, the display system is no longer anchored against the stationary frame. The process of reconfiguring the display system from the closed configuration to the open configuration includes relieving most of the tensile force applied to the display screen using adjustable tensioning mechanisms of the display systems.

18 Claims, 16 Drawing Sheets

LARGE DISPLAY SYSTEMS WITH SCREEN TENSION ADJUSTABILITY

CROSS-REFERENCE TO RELATED APPLICATION

This application is a continuation of U.S. application Ser. No. 15/383,988, filed Dec. 19, 2016, the contents of which are incorporated herein.

BACKROUND

This document relates to large format display systems, such as scanning-beam display systems.

In scanning-beam display systems, an optical beam can be scanned over a screen to form images on the screen. Some display systems, such as some laser display systems, use a polygon scanner with multiple reflective facets to provide horizontal scanning and a vertical scanning mirror, such as a galvo-driven mirror, to provide vertical scanning. The horizontal scanning and the vertical scanning are synchronized to each other to project images on the screen. Some such display systems may be equipped with touchscreen capability for receiving user input.

Typically, large format display systems are large, heavy structures. As such, making adjustments and performing maintenance on some large format display systems may be difficult and time-consuming.

SUMMARY

Examples and implementations of display systems are described that are reconfigurable between: (i) an open configuration designed for making adjustments and performing maintenance on the system and (ii) a closed configuration designed for normal operations of the display system. In the closed configuration, the display screen is intentionally subjected to a substantial amount of tensile force to advantageously stabilize the display screen. That substantial tensile force is facilitated by a tensioner and a sturdy stationary frame that the display screen is anchored against in the closed configuration. However, when the display system is reconfigured to the open configuration, the display system is no longer anchored against the stationary frame. Therefore, as a step in the process of reconfiguring the display system from the closed configuration to the open configuration, much of the tensile force applied to the display screen is relieved. Thus, the large format display systems described herein include tensioning mechanisms that allow the amount of tensile force applied to the display screen to be selectively adjustable.

In one aspect, this disclosure is directed to a display system that includes a stationary frame, a screen assembly, and a tensioner. The screen assembly includes a display screen mounted within a peripheral frame. The screen assembly is movably coupled to the stationary frame such that the display system is selectively reconfigurable between: (i) an open configuration in which the screen assembly is positioned away from the stationary frame such that the one or more imaging engines can be accessed through the stationary frame, and (ii) a closed configuration in which the screen assembly blocks access to the one or more imaging engines and in which the display screen is positioned to receive and display images projected from the one or more imaging engines. The tensioner may apply an adjustable tension to the display screen when the display system is in the closed configuration. The tensioner uses the stationary frame as an anchor for the tension while the tensioner applies the tension to the display screen.

Such a display system may optionally include one or more of the following features. In some embodiments, a plurality of springs are attached to the display screen deflect in response to the tension applied to the display screen by the tensioner. While the display system is in the open configuration, any tension of the display screen may be carried solely by the peripheral frame. The stationary frame may be configured to hold the one or more imaging engines. The screen assembly may be pivotably coupled to the stationary frame. The peripheral frame may define a peripheral slot within which edge portions around an entire periphery of the display screen are disposed. In some embodiments, there is dimensional clearance between the edge portions around an entire periphery of the display screen and the peripheral slot. The display screen may be a unitary flexible sheet of plastic. The display screen may include a top edge, a bottom edge, a first side edge, and a second side edge. The display screen may be coupled to the peripheral frame along the top edge and the bottom edge. In some embodiments, the display screen is not coupled to the peripheral frame along the first side edge and the second side edge. The display screen may include a top edge that is coupled to the peripheral frame by a plurality of hangers. Each hanger may be movably coupled to the peripheral frame. In some embodiments, each hanger can roll horizontally along a top member of the peripheral frame. The top edge may be also coupled to the peripheral frame by a center hanger that is fixedly coupled to the top member. The center hanger may be horizontally centered in relation to the top member. The display screen may thermally expand, and may thereby extend the hangers coupled to the peripheral frame. The display screen may include a bottom edge that is coupled to the peripheral frame by a plurality of hangers. Each hanger may include a spring used for applying the adjustable tension to the display screen. The display system may also include a plurality of dampers attached to the peripheral frame and in contact with the display screen. The peripheral frame may define a peripheral slot within which edge portions of the display screen are disposed. A plurality of elastic bumpers may be mounted to the peripheral frame contact the edge portions of the display screen to center the edge portions of the display screen within the peripheral slot. In some embodiments, the adjustable tension may be pre-adjusted.

Potential advantages may include (and are not limited to) one or more of the following.

First, some embodiments of the display systems described herein are designed for ease-of-serviceability. Such ease-of-serviceability is achieved, for example, by movably coupling a display screen assembly to a stationary frame that houses one or more imaging engines that project light onto the display screen. This arrangement allows the imaging engines to be conveniently accessed by simply moving the display screen assembly away from the stationary frame when such access is desired. In some embodiments, the display screen assembly is purposely made relatively light in weight such that movements of the display screen assembly can be performed manually. The large format display systems described herein include a display screen tensioner that facilitates and allows the display screen assembly to have a light-weight design, as described further below.

Second, some embodiments of the display systems described herein are advantageously designed for modularity and portability. For example, in some cases the display systems are designed to use a display screen that is a plastic sheet material that can be rolled into a compact arrangement for transport. Accordingly, the display screen can be transported through doors and passageways that might otherwise inhibit thoroughfare of more rigid types of screens. In use, the aforementioned display screen tensioner is designed to apply a high level of tension to the display screen, whereby the semi-flexible plastic sheet material is rendered substantially stable. Such stability advantageously contributes to enhanced image quality.

Third, some embodiments of the display systems described herein include a tensioner that can cause the display screen to have a rigidity that contributes to a solid tactile feel. The solid tactile feel can be particularly advantageous in the context of touchscreen display systems. The aforementioned tensioner, for example, contributes to the solid tactile feel. Additionally, in some embodiments shock absorbers and/or other mechanical features described herein also contribute to the solid tactile feel.

Fourth, some embodiments of the display systems described herein include a tensioner that can cause the display screen to have a rigidity that improves image quality when the screen is touched. By increasing tension, deflection of the screen when touched is reduced, and images projected onto the screen can be less subject to distortion when the screen is touched.

Fifth, some embodiments of the display systems described herein include design features that accommodate thermal expansion of the display screen. That is, the large format display systems are designed to allow the dimensions of the display screen to expand and contract in response to temperature changes of the display screen, while maintaining a substantially unaffected image quality.

The details of one or more embodiments are set forth in the accompanying drawings and the description below. Other aspects, features and advantages will be apparent from the description, drawings and claims.

DETAILED DESCRIPTION

In various implementations of display systems described herein, a system for selectively tensioning a flexible or semi-flexible display screen is included. The display screen tensioners described herein provide a number of benefits to users of display systems, and particularly to large format display systems. For example, as described further below, the capability to selectively tension the display screen plays a role in allowing the display system to be reconfigurable between an open configuration designed for making adjustments and performing maintenance on the system and a closed configuration designed for normal operations of the display system. During normal operations in the closed configuration, the tension on the display screen is applied at a first level, e.g., about 7,000 pounds to about 9,000 pounds (about 30 lbf/in to about 50 lbf/in). Accordingly, the display screen is stabilized, image distortion is minimized by minimizing the wobble inherent in untensioned screens (which causes the image to wobble), and a solid-feeling touchscreen can be provided. When maintenance or adjustment to the imaging engines are needed, the tension on the display screen is substantially reduced to a second level, and then the screen assembly can be conveniently moved to provide access to the imaging engines. Reducing the tension in preparation for moving the screen assembly allows the screen assembly to be designed with a relatively light weight which, in turn, facilitates the movability of the screen assembly for easy access to the light engines for maintenance, repair or replacement.

Figure 1:
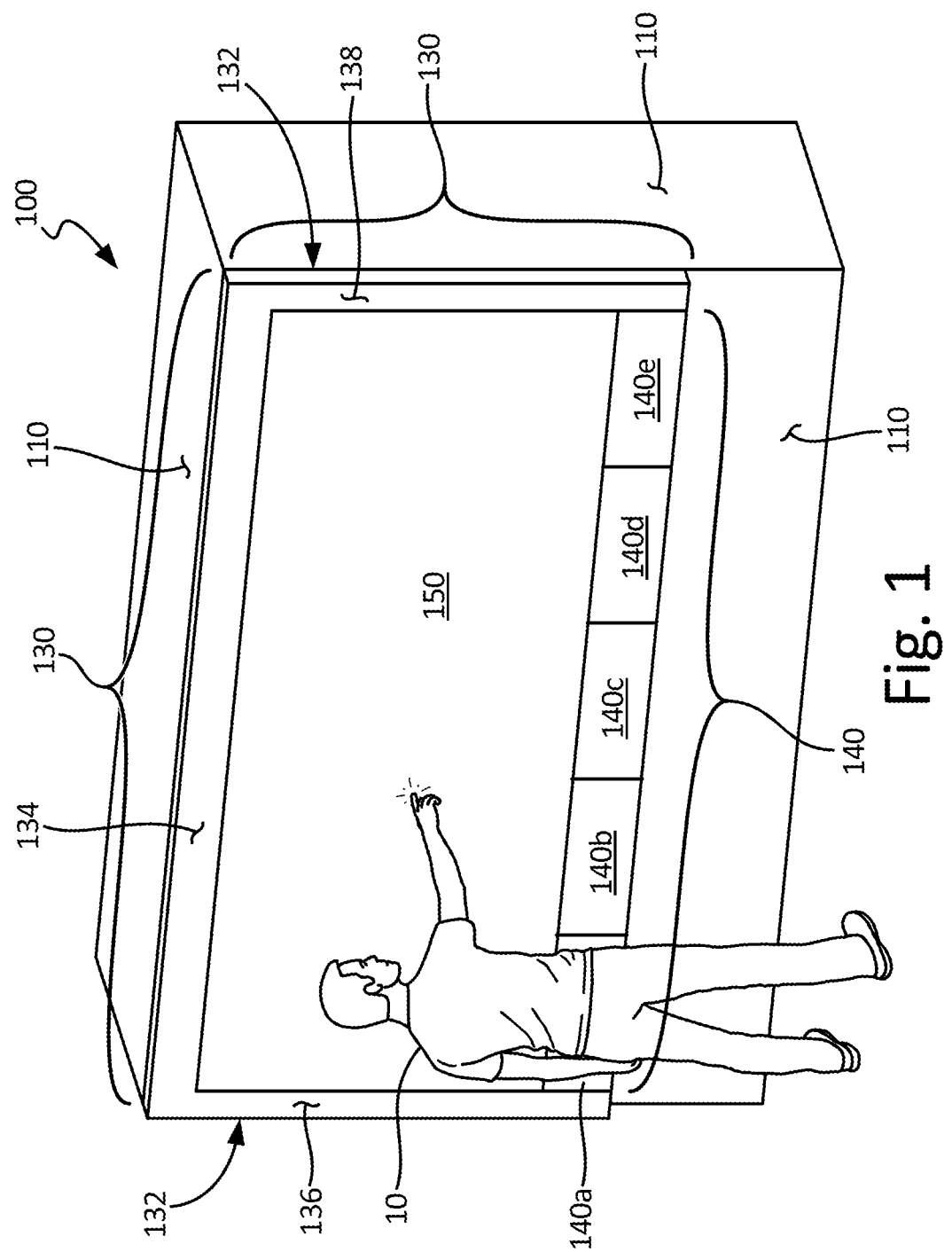
FIG. 1 is a perspective view of an example large format display system in accordance with some embodiments.

FIG. 1 depicts a human user 10 in relation to an example display system 100. The display system 100 can be any scale, but is generally greater than 1 meter measured diagonally. The display system 100 can be advantageously used in a number of different contexts such as, without limitation, industries including technology, energy, finance, healthcare, media, and universities. Moreover, the display system 100 is well-suited for a wide variety of different purposes and uses such as, but not limited to, video conferencing, digital whiteboards, data dashboards, enterprise social networks, video screens, and the like. In some cases, the display system 100 includes a touchscreen input capability.

As noted above, the display system is particularly suited as a large format display system, e.g., at least 1 meter diagonally, as this is the size at which weight of the screen assembly may tend to become an impediment to movability. As a large format display system, the display screen could be at least about 60 inches (1.5 meters) in height, or at least about 90 inches (2.3 meters) in height, or at least about 150 inches (3.8 meters) in height, or larger, and any size there between. For a screen assembly in which the display screen is a single or quilted plastic sheet, the display screen could be up to 200 square meters or more.

In the depicted embodiment, the display system 100 includes a stationary frame 110 and a screen assembly 130. As described further below, in the depicted embodiment the screen assembly 130 is movably coupled to the stationary frame 110 such that the display system 100 can be selectively reconfigured between: (i) an open configuration in which the screen assembly 130 is positioned away from the stationary frame 110 and (ii) a closed configuration in which the screen assembly 130 is positioned adjacent to or against the stationary frame 110.

The display system 100 is shown in the closed configuration in FIG. 1. In the closed configuration, the screen assembly 130 is properly positioned to receive and display images in the normal operative manner of the display system 100. Also in the closed configuration, the screen assembly 130 can be latched and anchored to the sturdy stationary frame 110 in a manner by which the structural rigidity the stationary frame 110 provides the rigidity of the display system 100, as described further below.

In the depicted embodiment, the screen assembly 130 includes a peripheral frame 132 and a display screen 150. As described further below, the display screen 150 is coupled to the peripheral frame 132 so that the peripheral frame 132 mechanically supports the display screen 150. The peripheral frame 132 mechanically supports the display screen 150 in an arrangement that is suited for displaying images on the display screen 150 (as shown) and in an arrangement that is suited for providing access to imaging engines located behind the display screen (as described further below in reference to FIG. 2).

In some embodiments, the display screen 150 comprises a monolithic sheet of flexible or semi-flexible material. For example, in some embodiments the display screen 150 comprises a sheet of made of a plastic, e.g., polycarbonate.

In some other embodiments, the display screen 150 comprises a composite of adjacent sheets of flexible or semi-flexible material that are stitched, fused or taped together. For example, in some embodiments the display screen 150 comprises sheets of made of a plastic, e.g., polycarbonate.

The display screen can also include light-emitting materials or fluorescent materials that emit light under excitation from a scanning beam imaging engine. In some embodiments the display screen 150 comprises a second sheet (or multiple tiles) that includes the light-emitting materials or fluorescent materials. This second sheet or tiles can be positioned on a side of the display screen 150, e.g., on a side of the monolithic sheet, closer to the imaging engines; the monolithic sheet can be on the user side of the display screen. In some cases, a vacuum is drawn in the space(s) between layers of the display screen 150, e.g., between the monolithic sheet and the second sheet or tiles, to make sure they adhere together during use. This can assist the layers in remaining in horizontal alignment, e.g., while the display screen 150 expands or contracts from temperature variations, while receiving pressure from person touching the display screen 150, and the like.

In some embodiments, the display screen 150, e.g., the second sheet or tiles, includes three different color phosphors that are optically excitable by laser beams to respectively produce light in red, green, and blue colors suitable for forming color images. These phosphors may be formed on the second sheet as pixel dots or as repetitive red, green, and blue phosphor stripes in parallel.

The peripheral frame 132 includes a top member 134, a first side member 136, a second side member 138, and a multi-segmented bottom member 140. In the depicted example embodiment, the multi-segmented bottom member 140 includes five bottom member segments 140a, 140b, 140c, 140d, and 140e. In some embodiments, the bottom member 140 can include other numbers of segments such as one, two, three, four, six, seven, eight, nine, ten, eleven, twelve, twenty, thirty, forty, fifty, sixty, seventy, eighty, ninety, one hundred, or more, and any integer therebetween. In some embodiments, each segment of the multi-segmented bottom member 140 is about the same dimension in width. In some embodiments, one or more segments of the multi-segmented bottom member 140 are wider than one or more other segments of the multi-segmented bottom member 140.

In the depicted embodiment, the side members 136 and 138 are each rigidly attached to and extending from and perpendicular to the top member 134. The multi-segmented bottom member 140, in contrast, is movably attached to the other portions of the peripheral frame 132. In fact, each of the bottom member segments 140a, 140b, 140c, 140d, and 140e has some freedom to individually move independently of each other and independent of the other portions of the peripheral frame 132. As described further below, the fact that the bottom member segments 140a, 140b, 140c, 140d, and 140e are movable in relation to the other portions of the peripheral frame 132 is part of the mechanism used to selectively tension the display screen 150.

In the closed and tensioned configuration (as shown), the screen assembly 130 is operatively positioned to receive and display images on display screen 150. Also in the closed configuration, the screen assembly 130 is latched and anchored to the stationary frame 110 in a manner that allows the structural rigidity the stationary frame 110 to provide the structural rigidity of the peripheral frame 132. That supplemental structural support of the stationary frame 110 can be advantageously used to enable a high level of tension to be applied to the screen assembly 130. In other words, a higher amount of tension can be applied to the screen assembly 130, without damaging the peripheral frame 132, using the structural rigidity of the stationary frame 110 in combination with the peripheral frame 132 in comparison to using the structural rigidity of the peripheral frame 132 by itself.

Figure 2:
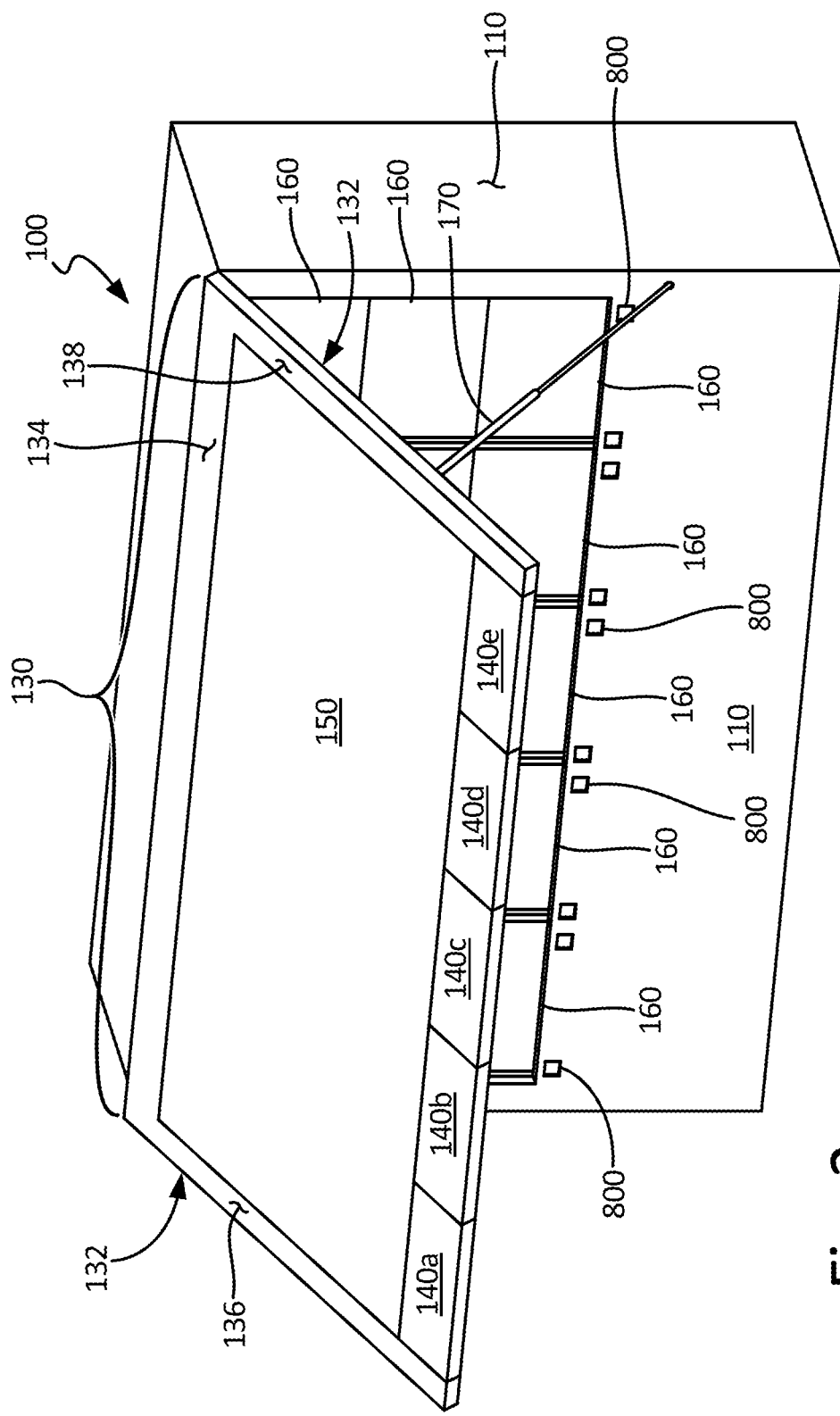
FIG. 2 is a perspective view of the large format display system of FIG. 1 with its screen assembly arranged in an open position to provide access to the imaging engines of the system.

Referring to FIG. 2, the example display system 100 is shown in in an open configuration in which the screen assembly 130 is positioned away from the stationary frame 110 such that one or more imaging engines 160 (schematically represented) can be accessed through the stationary frame 110.

If there are a plurality of imaging engines 160, they can be arranged in a rectangular array, although this is not required. The imaging engines 160 can be supported on a framework. For example, the framework can include one or more horizontal struts, with each horizontal strut supporting a row of one or more imaging engines 160. The framework can also include vertical struts to support the horizontal struts. In some embodiments, each pair of adjacent imaging engines 160 is separated by a strut, so that the framework forms an array of separated spaces, each space sized to receive a single imaging engine.

In the embodiment depicted in FIG. 2, the stationary frame 110 itself provides the framework, so the imaging engines 160 are mounted on the stationary frame 110. But in some embodiments the imaging engines 160 are not coupled to the stationary frame 110 at all, but the framework is separated from the stationary frame 110 such that the stationary frame 110 is positioned between the imaging engines 160 and the screen assembly 130.

The ability to configure the display system 100 in the open configuration can be particularly advantageous when the framework holding the imaging engines, e.g., the stationary frame 110, is butted up against a wall so that access from the rear of the display system 100 to the imaging engines 160 is inhibited or not possible. In such a case, by configuring the display system 100 in the open configuration as shown, the imaging engines 160 can be accessed from the front of the display system 100 for maintenance, adjustment, or replacement. While the depicted embodiment includes a three-by-five array of imaging engines 160, it should be understood that the display system 100 could be configured for any number of imaging engines 160.

In the depicted embodiment, the screen assembly 130 is pivotably attached (e.g., hinged) to the stationary frame 110. In the depicted embodiment the top of the screen assembly 130, e.g., the top member 134, is pivotably attached to the stationary frame 110. However, in some embodiments the bottom or one of the sides of the screen assembly 130 is pivotably attached to the stationary frame 110.

In some embodiments, the screen assembly 130 is movably attached to the stationary frame 110 in a manner other than pivotably attached. For example, in some embodiments a four-bar linkage is used so that an entirety of the screen assembly 130 can be moved away from the stationary frame 110. Other types of linkages and slides can also be used.

In the depicted embodiment, the screen assembly 130 is manually movable away from the stationary frame 110. In some embodiments, the movement of the screen assembly 130 can be powered using one or more motors, hydraulic cylinders, and the like. In the depicted embodiment, gas shocks 170 are included to provide an assist for opening the display system 100, and for supporting the screen assembly 130 in the open configuration. Springs and/or counterweights and the like can also be used in some embodiments.

While the display system 100 is in the open configuration, a lower amount of tension is applied to the display screen 150 as compared to the amount of tension applied to the display screen 150 while the display system 100 is fully operational in the closed and tensioned configuration. In some cases, essentially no tension is applied to the display screen 150 while the display system 100 is in the open configuration. In the open configuration, only the tension applied by the peripheral frame 132 itself (if any) is applied to the display screen 150. However, while the display system 100 is closed, the display screen 150 can be selectively tensioned, i.e., either fully tensioned at an operational level or relieved of tension except for the tension applied by the peripheral frame 132 (if any). Moreover, all of the tension levels are selectively adjustable.

The procedure for switching the display system 100 from the operable configuration to the open configuration can be summarized as follows. First, the high level of tension that is applied to the display screen 150 while the display system 100 is operable (i.e., in the closed and tensioned configuration) is reduced. Said another way, the tension of the display screen 150, which is carried, anchored, or counteracted by the stationary frame 110 while the display system 100 is in the operable configuration (i.e., closed and tensioned), is reduced. When the tension has been reduced, the screen assembly 130 can be moved away from the stationary frame 110 to the open configuration.

By having a releasable-tensioned display screen 150, the strength and therefore resultant weight of the screen assembly 130 can be reduced (thereby making it possible to construct the peripheral frame 132 of lighter weight materials for easier handling), and the released-tensioned screen 150 may also reduce the risk of injury to a user.

Figure 3:
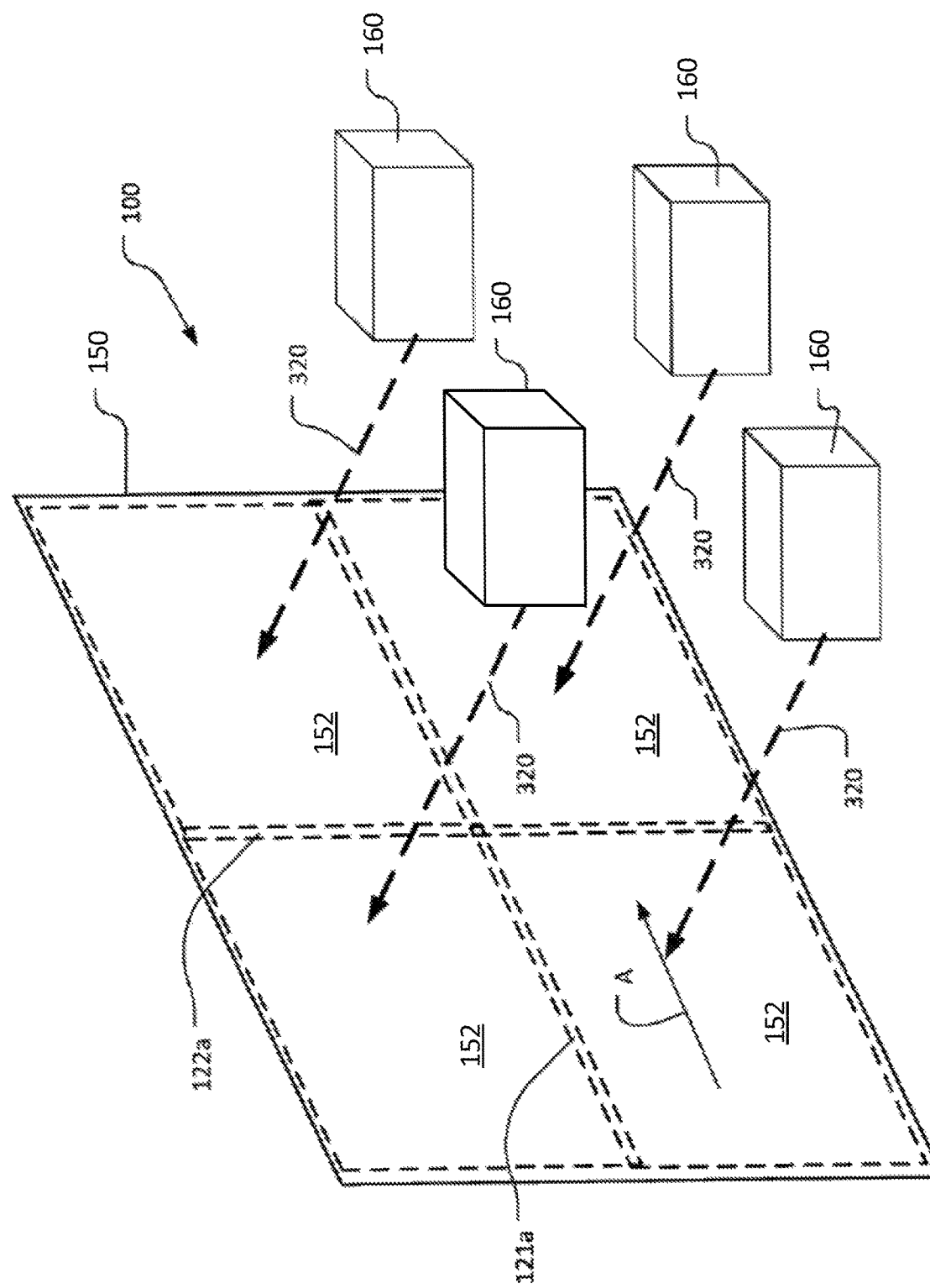
FIG. 3 is a schematic of an example arrangement of multiple scanning beam imaging engines being used to project images on a screen of a large format display system.

FIG. 3 schematically shows an example of the display screen 150 from the back side of the display screen 150. As shown, the display screen 150 includes multiple constituent display regions 152 that correspond to multiple imaging engines 160 (e.g., scanning beam engines). In this example, four display regions 152 and four imaging engines 160 are included, but any number can be included. The display regions 152 are arranged in an array, e.g., a rectangular array. Each display region 152 can be quadrilateral, e.g., generally rectangular except for effects from keystoning, although this is not required.

In some embodiments, each scanning beam engine 160 generates a scanning beam 320, e.g., an light beam, e.g., a laser beam, that scans, e.g., raster scans, across the associated display region 152, e.g., as shown by arrow A. In a scanning beam display system, each display region 152 of the screen 150 can include light-emitting materials or fluorescent materials that emit light under excitation from the associated scanning beam 320. In some implementations, three different color phosphors that are optically excitable by the laser beam to respectively produce light in red, green, and blue colors suitable for forming color images may be formed on the screen as pixel dots or repetitive red, green and blue phosphor stripes in parallel.

Phosphor materials are one type of fluorescent materials. However, other optically excitable, light-emitting, non-phosphor fluorescent materials can be used. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

A scanning beam display system uses at least one scanning beam to excite color light-emitting materials deposited on a screen to produce color images. The scanning beam is modulated to carry images for red, green and blue colors or in other visible colors and is controlled in such a way that the scanning beam excites the color light-emitting materials in red, green and blue colors with images in red, green and blue colors, respectively. Hence, the scanning beam carries the images but does not directly produce the visible light seen by a viewer. Instead, the color light-emitting fluorescent materials on the screen absorb the energy of the scanning beam and emit visible light in red, green and blue or other colors to generate actual color images seen by the viewer.

Each scanning beam engine 160 can include a laser source to produce a scanning laser beam that excites a phosphor material on the screen may be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multi-modes to ensure sufficient brightness of the screen.

Figure 4:
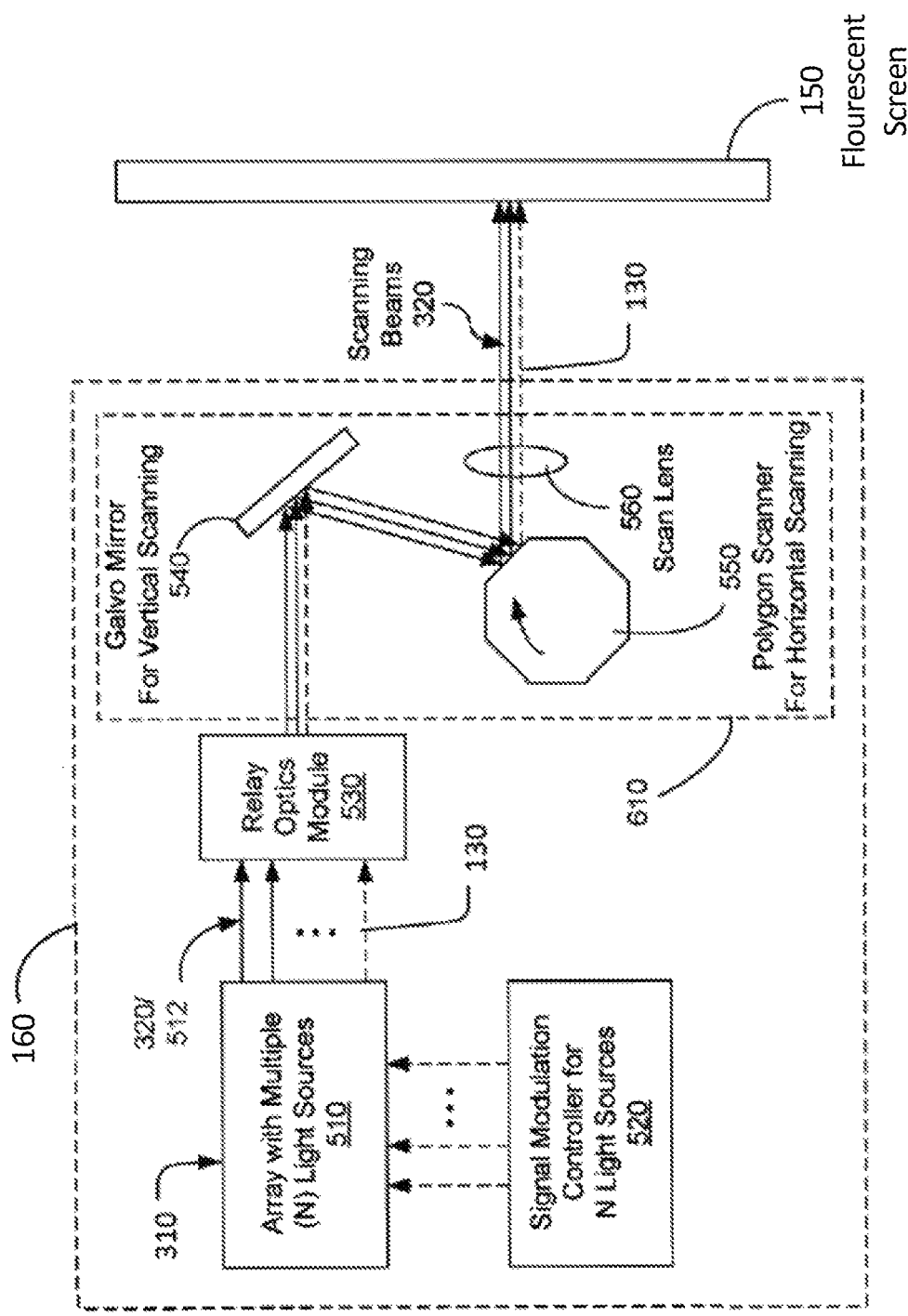
FIG. 4 is a schematic of an example scanning beam imaging engine.

FIG. 4 schematically shows a non-limiting example implementation of the imaging engines 160 (in this case a scanning beam engine). The scanning beam engine 160 includes a light source 310 to generate multiple excitation beams 320 to simultaneously scan the screen 150. The excitation beams 320 can be laser beams. For example, the light source 310 can be a laser array 510 with multiple lasers to generate multiple laser beams 512.

A signal modulation controller 520 is provided to control and modulate the excitation beam 320. For example, the modulation controller 520 can control and modulate the lasers in the laser array 510 so that the laser beams are modulated to carry the image to be displayed on the screen 150. The signal modulation controller 520 can include a digital image processor that generates digital image signals for the three different color channels. The signal modulation controller 520 can include laser driver circuits that produce laser control signals carrying the digital image signals. The laser control signals are then applied to modulate the lasers, e.g., the currents for laser diodes, in the laser array 510.

The beam scanning can be achieved by a scanning imaging module 610. The scanning imaging module 610 can include a scanning mirror 540 such as a galvo mirror for the vertical scanning and a multi-facet polygon scanner 550 for the horizontal scanning. A scan lens 560 can be used to project the scanning beams from the polygon scanner 550 onto the screen 150. The scan lens 560 is designed to image each beam 512 onto the screen 150. Each of the different reflective facets of the polygon scanner 550 simultaneously scans N horizontal lines where N is the number of beams 320. Such a system is described in U.S. Pat. No. 9,041,762, incorporated herein by reference for that purpose.

In the example illustrated in FIG. 4, the excitation beams 320 are first directed to the galvo mirror 540 and then from the galvo mirror 540 to the polygon scanner 550. Alternatively, the excitation beams 320 can be first directed to the polygon scanner 550 and then from the polygon scanner 550 to the galvo mirror 540. Other possibilities for the scanning imaging module 610 include multiple galvo mirrors, multiple polygon scanners, or an array of micro-mirrors, e.g., a digital micromirror device (DMD).

The excitation beams 320 are scanned spatially across the screen 150 to hit different color pixels at different times. Accordingly, each of the modulated beams 320 carries the image signals for the red, green and blue colors for each pixel at different times and for different pixels at different times. Hence, the modulated beams 320 are coded with image information for different pixels at different times by the signal modulation controller 520. The excitation beam scanning thus maps the time-domain coded image signals in the beams 320 onto the spatial pixels on the screen 150. For example, the modulated beams 320 can have each color pixel time equally divided into three sequential time slots for the three color subpixels for the three different color channels. The modulation of the beams 320 may use pulse modulation techniques to produce desired grey scales in each color, a proper color combination in each pixel, and desired image brightness.

In one implementation, the multiple beams 320 are directed onto the screen 150 at different and adjacent vertical positions with two adjacent beams being spaced from each other on the screen 150 by one horizontal line of the screen 150 along the vertical direction. For a given position of the galvo mirror 540 and a given position of the polygon scanner 550, the beams 320 may not be aligned with each other along the vertical direction on the screen 150 and may be at different positions on the screen 150 along the horizontal direction. The beams 320 can only cover one portion of the screen 150.

Figure 5:
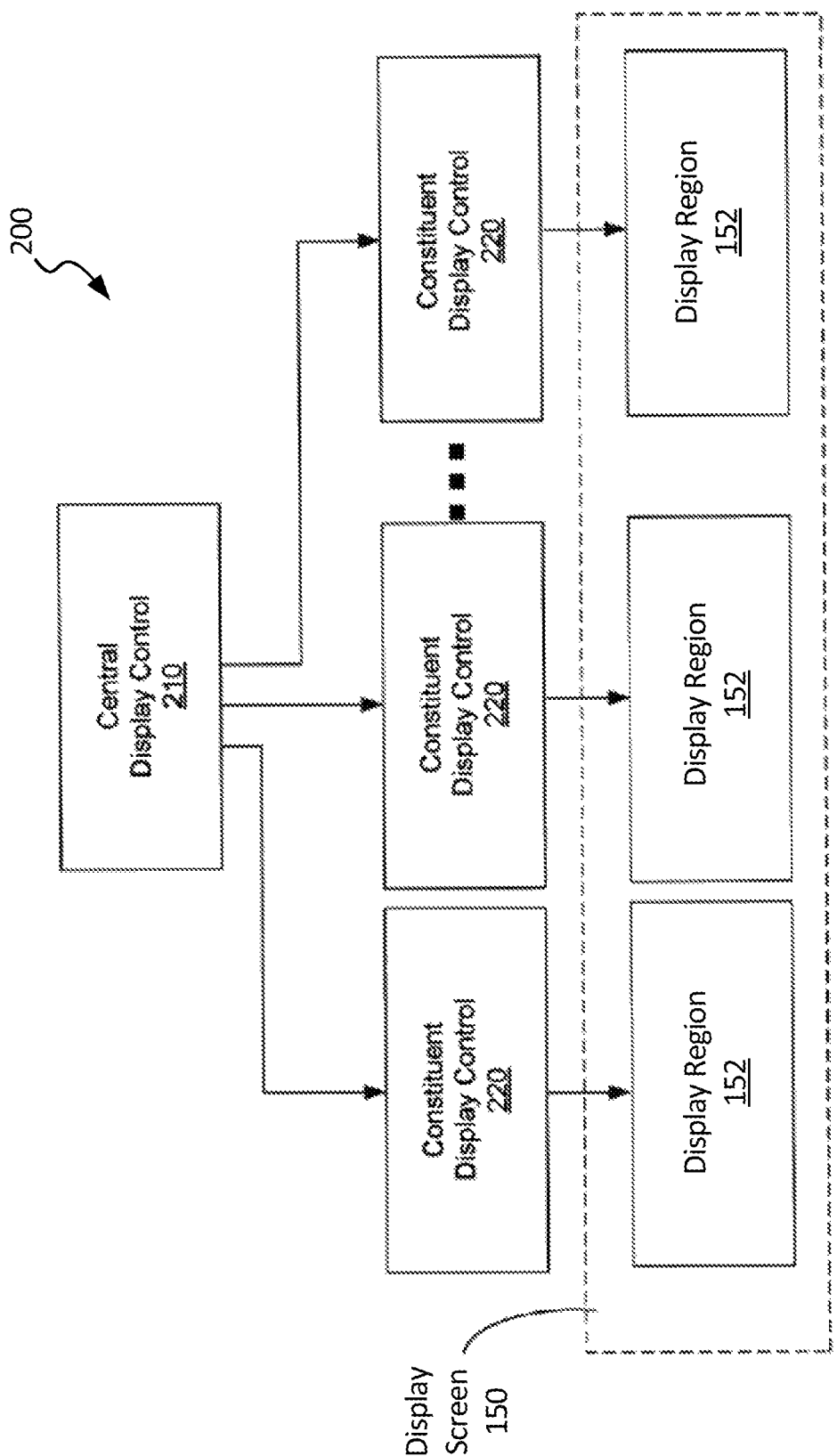
FIG. 5 is a schematic of an example control system of a large format display system.

FIG. 5 shows an example of the control system 200 for the large format display system 100 of FIG. 1. In this example, each constituent display region 152 has its own display control 220 that controls the operations of each display region 152. A central control 210 for the display 150 is connected in communication with the display controls 220 for the constituent display region 152 and control each region 1582 to display a fraction or portion of the full image displayed by the display screen 150. The central control 210 can be programmed to control, e.g., by providing signals to the constituent display controls 220, selected areas of each display region 152 that are on a border with another adjacent screen 152 to have a lower display brightness in order to reduce the visibility of the overlap of adjacent regions 152.

Alternatively, the central control 210 can be eliminated, and each constituent display control 220 could operate independently, with each be programmed to control selected areas of each display region 152 that are on a border with another adjacent screen 152 to have a lower display brightness in order to reduce the visibility of the overlap of adjacent regions 152.

Figure 6:
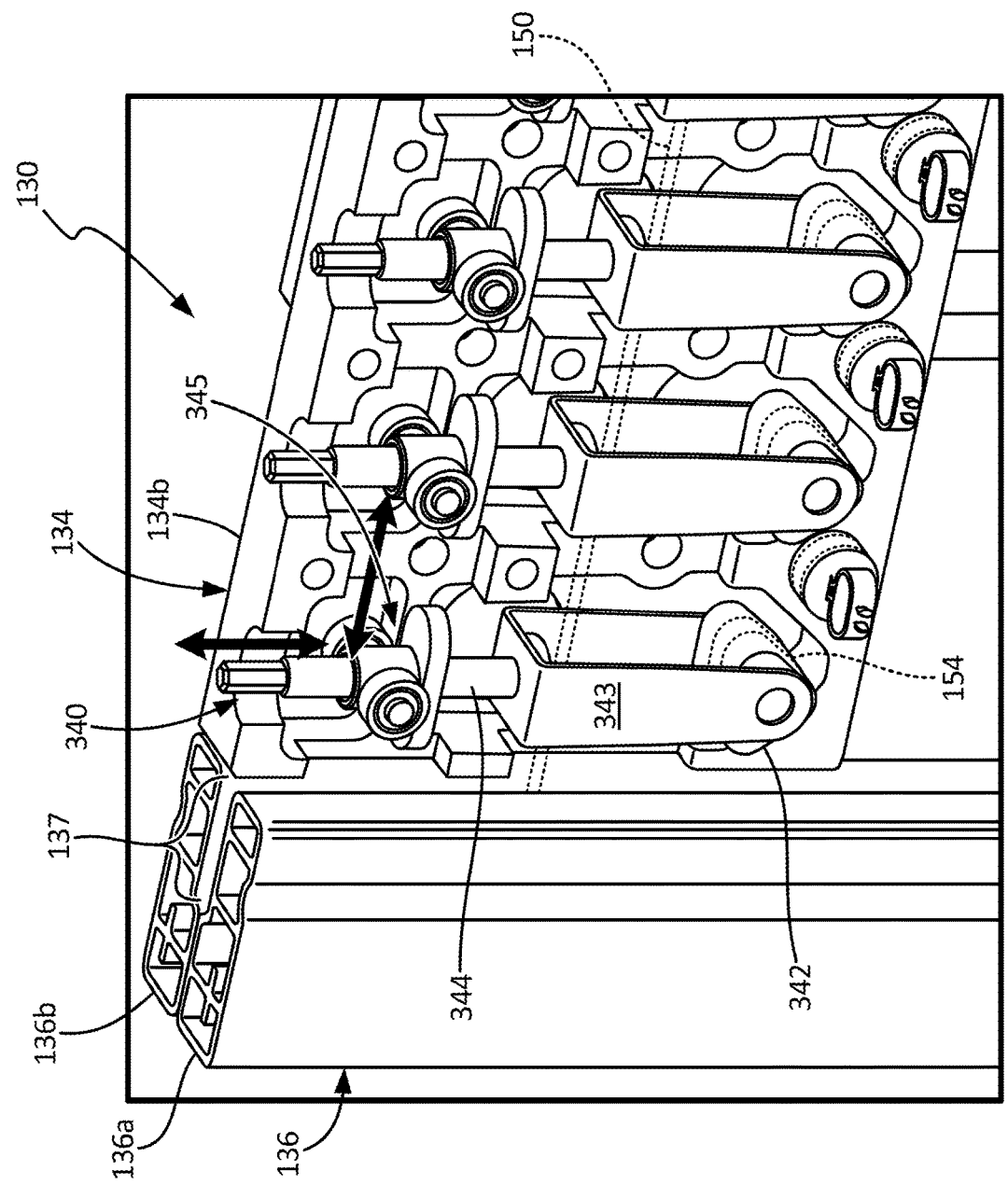
FIG. 6 is a perspective cutaway view of a top corner portion of an example screen assembly in accordance with some embodiments.

FIG. 6 shows a cutaway of a portion of the screen assembly 130. In particular, a cutaway view of the upper left corner of the screen assembly 130 is shown. Here, the juncture of the top member 134 and the first side member 136 is visible, along with a corner portion of the display screen 150. The depicted structure is also representative of the structure at the upper right corner of the screen assembly 130. That is, the upper right corner of the screen assembly 130 is a mirror image of the upper left corner of the screen assembly 130 as shown.

In the depicted embodiment, the first side member 136 is comprised of a front member 136a and a rear member 136b. In some embodiments, the front member 136a and the rear member 136b (and the other members of the peripheral frame 132) can be machined, extruded, or cast members made of a metallic material such as, but not limited to, aluminum. The front member 136a and the rear member 136b are fixedly attached together. In some embodiments, the first side member 136 is comprised of a single member.

A slot 137 is defined between the front member 136a and the rear member 136b. The slot 137 slidingly receives the left edge of the display screen 150 with a clearance fit. Accordingly, the left edge of the display screen 150 is positioned within the slot 137, but the left edge of the display screen 150 is free to move within the slot 137 parallel to the plane of the display screen 150 without binding or resistance. In the case of a curved display screen, the phrase "free to move within the slot 137 parallel to the plane of the display screen 150 without binding or resistance" refers to the locally flat portion adjacent at the edges of the curved display screen. The freedom of movement of the left edge of the display screen 150 within the slot 137 allows the display screen 150 to expand/contract (horizontally and/or vertically) without binding within the slot 137. As described further below, slots with clearance for the edge portions of the display screen 150 are defined around an entirety of the peripheral frame 132. Accordingly, the display screen 150 has freedom to expand/contract within the plane of the display screen 150 (horizontally and vertically) without binding in relation to the entire peripheral frame 132. Such freedom is advantageous during scenarios such as thermal expansion/contraction of the display screen 150, and narrowing/widening of the display screen 150 in response to stretching/relaxing the display screen 150.

As with the two-part side member 136, the top member 134 is depicted as a two-part member (i.e., front top member 134a and rear top member 134b). However, in FIG. 6 the front top member 134a is not shown so that upper display screen hanger assemblies 340 are visible. The top member 134 defines a gap (like the side members 136 and 138) within which the top edge of the display screen 150 is free to move without binding or resistance, albeit subject to constraint by the hanger assemblies 340. As described further below in reference to FIG. 16, while the gaps defined by the peripheral frame 132 include clearance so the display screen 150 is free to move in the gap (i.e., within the plane defined by the display screen 150), when the display screen 150 is deflected (such as from a user's touch) the display screen 150 may contact the peripheral frame 132 in a manner by which the peripheral frame 132 enhances the stiffness of the display screen 150.

The display screen 150 is coupled to the top member 134 using a plurality of upper display screen hanger assemblies 340. In brief, the display screen 150 hangs on the hanger assemblies 340, and the hanger assemblies 340 hang on the top member 134. In particular, the upper display screen hanger assemblies 340 can be coupled to the display screen 150 at a lower end of the upper display screen hanger assemblies 340 and can be movably coupled to the top member 134 at an upper end of the upper display screen hanger assemblies 340.

In the depicted embodiment, the coupling between the display screen 150 and the upper display screen hanger assemblies 340 comprises a triangular peg member 342 of an upper display screen hanger assembly 340 positioned within a correspondingly-shaped and sized triangular opening 154 through the display screen 150. While not required in all embodiments, the triangular shape of the peg member 342 and opening 154 provides a flat surface interface by which the tensile force of the display screen 150 can be transferred to the upper display screen hanger assemblies 340 at a practicable level of pressure. In some embodiments, shapes other than triangular can be used for the peg member 342 and opening 154. For example, shapes such as circular, rectangular, ovular, elliptical, polygonal, and the like, and combinations thereof, can be used in some embodiments. In the depicted embodiment, the triangular shape of the peg member 342 and opening 154 have relatively large corner radii to advantageously distribute stress on the display screen 150. The triangular openings 154 are spaced close enough to each other to maximize the number of contacts (and thus decrease the stress per opening), while being spaced apart from each other to minimize hole-to-hole stress spreading.

Still referring to the upper display screen hanger assemblies 340, in some embodiments the triangular peg member 342 is rotatably coupled to a fork member 343. Accordingly, the fork member 343 is pivotable in relation to the triangular peg member 342. In some embodiments, the fork member 343 is fixedly attached to the triangular peg member 342 so that pivoting is not facilitated.

A stud 344 extends from the fork member 343. In some embodiments, the stud 344 is pivotable in relation to the fork member 343. The stud 344 is connected to a bearing assembly 345. In some embodiments, the stud 344 and is vertically adjustable in relation to the bearing assembly 345. The bearing assembly 345 makes contact with the front top member 134a (not shown) and the rear top member 134b. In particular, the bearing assembly 345 sits on a horizontal ledge formed by the front top member 134a and the rear top member 134b. The bearing assembly 345 is free to slide horizontally parallel to the plane of the display screen on the ledge. In the depicted embodiment the bearing assembly 345 makes low friction rolling contact with the top members 134a and 134b. Accordingly, as the display screen 150 thermally expands/contracts in a lateral (horizontal) direction, the bearing assembly 345 can roll along the top member 134 without binding or resistance.

In the depicted embodiment, the longitudinal interrelationship between the stud 344 and the bearing assembly 345 (i.e., along the vertical direction in FIG. 6) is adjustable. For example, the stud 344 can have a threaded relationship with the bearing assembly 345 such that rotation of the stud 344 in relation to the bearing assembly 345 will longitudinally extend or retract the upper display screen hanger assembly 340. Such adjustability provides an ability to compensate for dimensional variations, and to equalize the stress from opening-to-opening 154 across the display screen 150. While in the depicted embodiment the bearing assembly 345 includes roller bearings, in some embodiments other types of mechanisms are used such as low-friction shoes that slide on the horizontal ledges formed by the front top member 134a and the rear top member 134b. Further, in some embodiments pivoting mechanisms are used in addition to, or as an alternative to, bearings or shoes.

Figure 7:
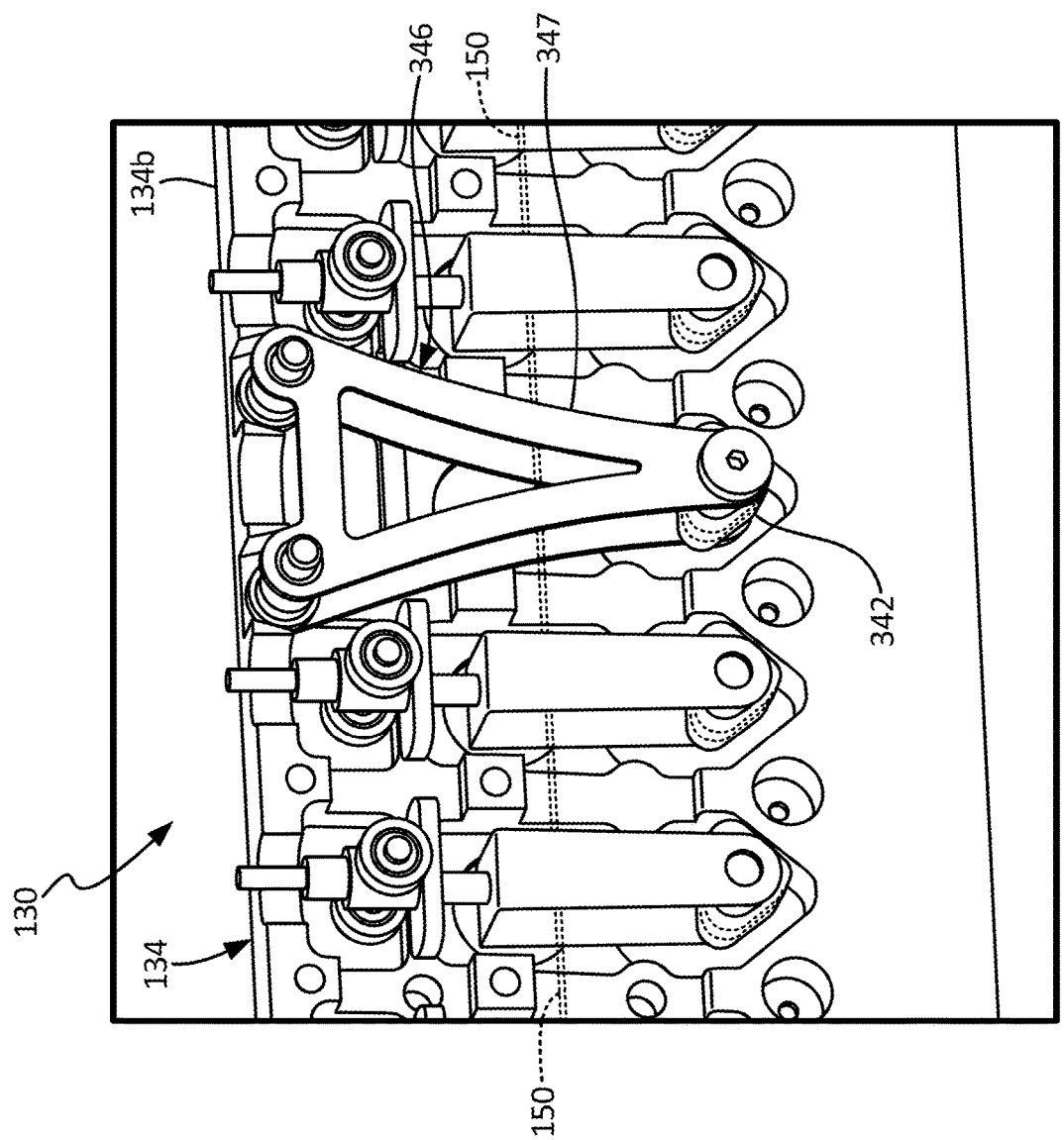
FIG. 7 is a perspective cutaway view of a top center portion of an example screen assembly in accordance with some embodiments.

FIG. 7 shows another cutaway view of a portion of the screen assembly 130. In this particular view a cutaway of a central upper portion of the screen assembly 130 is shown. More specifically, a middle upper edge portion of the display screen 150 and a central portion of the top member 134 is shown. Here again, only one part of the two-part top member 134 is depicted (i.e., the front top member 134a is not shown while rear top member 134b is shown). The front top member 134a is not shown so that a fixed upper display screen hanger assembly 346 is visible. As described above in reference to side members 136 and 138, the top member 134 defines a gap (along an entire length of the top member 134) within which the top edge portion of the display screen 150 is free to move vertically and horizontally without binding or resistance.

The fixed upper display screen hanger assembly 346 is in some ways similar to the upper display screen hanger assemblies 340 described in reference to FIG. 6. The hanger assemblies 340 and 346 can be similar in the way that the hanger assemblies 340 and 346 interface with the display screen 150, e.g., using a triangular peg member 342 within a correspondingly-shaped and sized triangular opening 154 through the display screen 150. The hanger assemblies 340 and 346 are notably different, however, in that the fixed upper display screen hanger assembly 346 does not allow lateral (horizontal) movement of the fixed upper display screen hanger assembly 346 in relation to the top member 134. Instead, the fixed upper display screen hanger assembly 346 is fixedly positioned in relation to the top member 134. Accordingly, the fixed upper display screen hanger assembly 346 serves to define a reference position for locating and maintaining the center of the display screen 150 at the center of the peripheral frame 132. Additionally, only one fixed upper display screen hanger assembly 346 is included in the screen assembly 130 (i.e., at the center top position), while a plurality of the upper display screen hanger assemblies 340 are included (i.e., to the left and right of the fixed upper display screen hanger assembly 346).

Having the fixed upper screen hanger 346 positioned at the center display screen 150 is preferable, as it minimizes the movement of the two side edges of the display screen due to thermal expansion and contraction. However, in some embodiments the fixed upper screen hanger 346 could be positioned at one edge of the display screen 150, and in some embodiments the fixed upper screen hanger 346 could be positioned anywhere between center and one of the edges of the display screen 150.

The central upper display screen hanger assembly 346 can include a yoke assembly 347. In the depicted embodiment, a lower end of the yoke assembly 347 is rotatably coupled to the triangular peg member 342. Therefore, the display screen 150 can be pivoted in relation to the central upper display screen hanger assembly 346. Such adjustability can be advantageous, for example, while adjusting the display screen 150 to orient it squarely in alignment with the optical image(s) being projected onto the display screen 150. The upper end of the yoke assembly 347 couples with the top member 134 in a manner whereby the central upper display screen hanger assembly 346 is held stable in relation to the top member 134. In the depicted embodiment for example, the upper end of the yoke assembly 347 couples with the top member 134 at two locations that are spaced apart from each other to provide a stable coupling relationship.

Figure 8:
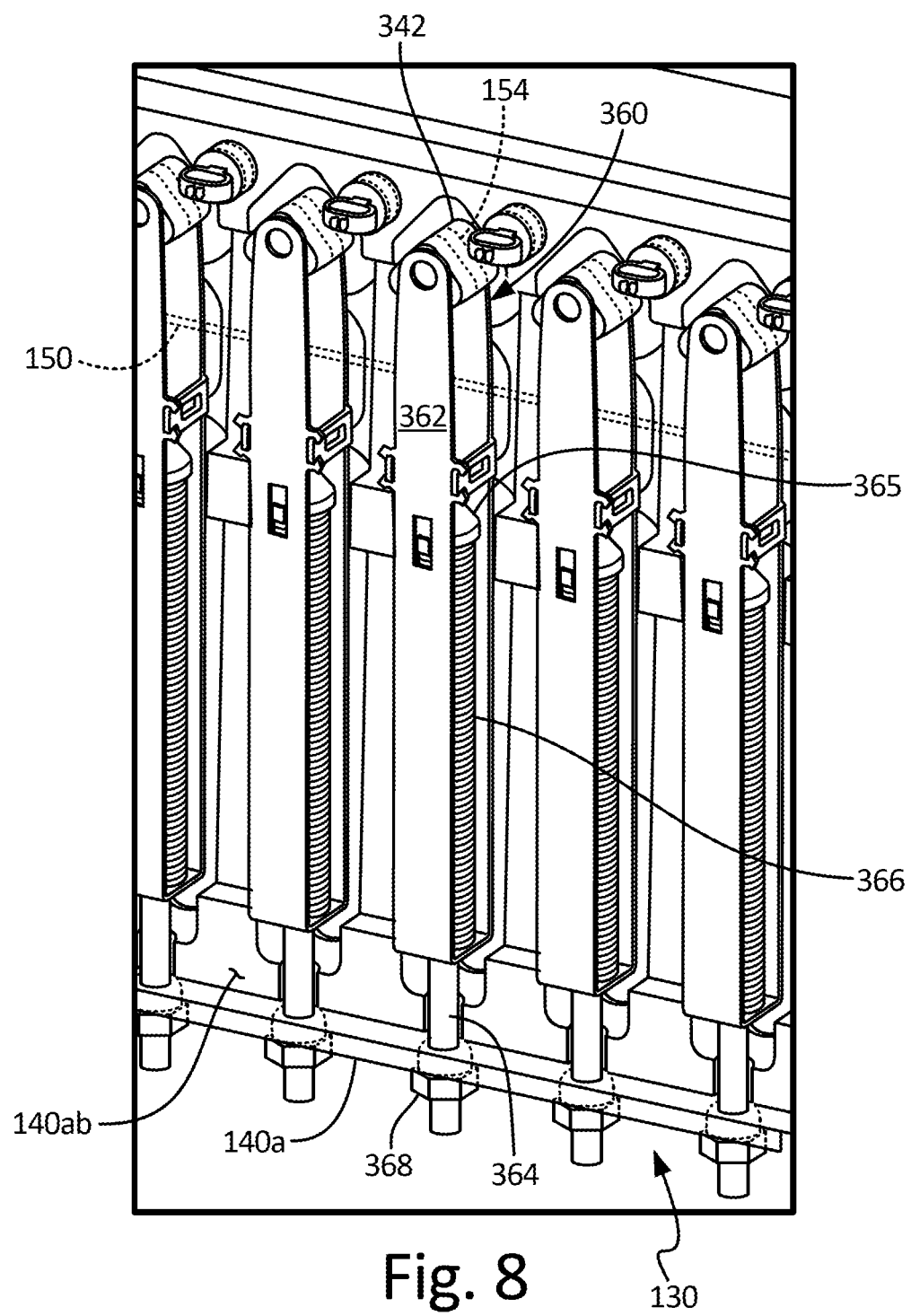
FIG. 8 is a perspective cutaway view of a bottom center portion of an example screen assembly showing spring assemblies for tensioning the display screen in accordance with some embodiments.

FIG. 8 shows another cutaway view of a portion of the screen assembly 130. In this particular view a cutaway of a lower portion of the screen assembly 130 is shown. More specifically, a lower edge portion of the display screen 150 and a portion of the multi-segmented bottom member 140 is shown. In particular, a portion of the bottom member segment 140a is depicted here. The structure of each segment of the multi-segmented bottom member 140 is represented by the structure of bottom member segment 140a as shown. Here again, only one part of the two-part bottom member segment 140a is depicted (i.e., the front bottom member segment 140aa is not shown while rear bottom member segment 140ab is shown). The front bottom member segment 140aa is not shown so that lower display screen hangers 360 are visible. As described above in reference to top member 134 and side members 136 and 138, the multi-segmented bottom member 140 defines a gap (along an entire length of the multi-segmented bottom member 140) within which the bottom edge portion of the display screen 150 is free to move vertically and horizontally parallel to the plane of the display screen 150 without binding or resistance. In the case of a curved display screen, the phrase "free to move vertically and horizontally parallel to the plane of the display screen 150 without binding or resistance" refers to the locally flat portion adjacent at the edges of the curved display screen.

Each segment of the multi-segmented bottom member 140 is coupled to the display screen 150 using a plurality of the lower display screen hangers 360. In brief, when the display screen 150 is not under applied tension, the lower screen hangers 360 hang from the display screen 150. As with the upper display screen hanger assemblies 340 and the central upper display hanger screen assembly 346, each of the lower display screen hangers 360 can be coupled to the display screen 150 using a triangular peg member 342 within a correspondingly-shaped and sized triangular opening 154 through the display screen 150. In some embodiments, shapes other than triangular can be used for the peg member 342 and the opening 154. For example, shapes such as circular, rectangular, ovular, elliptical, polygonal, and the like, and combinations thereof, can be used in some embodiments.

The lower display screen hangers 360 can include a yoke assembly 362 that is pivotably coupled to the triangular peg member 342. The lower display screen hangers 360 can also include a plunger rod 364, a compression spring 366, and a nut 368. The yoke assembly 362 can be coupled to the bottom member segment 140a using the plunger rod 364, the compression spring 366, and the nut 368. So, it should be understood that the lower display screen hangers 360 are coupled: (i) to the display screen 150 at the top of the lower display screen hangers 360 using the triangular peg member 342 positioned within a correspondingly-shaped and sized triangular opening 154 and (ii) to the bottom member segment 140a at the bottom of the lower display screen hangers 360 using the nut 368 that is threadably engaged with the lower portion of the plunger rod 364.

The plunger rod 364 extends longitudinally through the inner diameter of the compression spring 366 along the entire length of the compression spring 366. A cap 365 is fixedly attached to the upper end of the plunger rod 364. The outer diameter of the cap 365 is larger than the outer diameter of the top end of the compression spring 366 such that the cap 365 engages with the top end of the compression spring 366. The bottom end of the compression spring 366 is abutted against the yoke assembly 362. This arrangement enables the plunger rod 364 to exert compression on the compression spring 366. That is, when the plunger rod 364 is translated downward in relation to the yoke assembly 362, the cap 365 will also translate downward to compress (shorten in length) the compression spring 366 against the yoke assembly 362.

While the compression spring 366 is in a state of compression (i.e., shortened in comparison to its natural, uncompressed/unstressed state), the resulting spring force causes tensioning of the display screen 150. That tension of the display screen 150 is counteracted at the top of the display screen 150 by the top member 134 (via the upper display screen hangers 340 and 346), and is counteracted at the bottom of the display screen 150 by the multi-segmented bottom member 140 (via the lower display screen hangers 360). Said another way, the display screen 150 is vertically stretched (tensioned) in relation to the peripheral frame 132 between the top member 134 and the multi-segmented bottom member 140 while the compression springs 366 are in a state of compression.

While the display system 100 is in the closed configuration (refer to FIG. 1), the multi-segmented bottom member 140 of the peripheral frame 132 can engage and catch against the stationary frame 110. As such, when the coupled to (anchored to) the stationary frame 110, the stationary frame 110 structurally supplements the peripheral frame 132 such that the tension on the display screen 150 is carried primarily by the stationary frame 110, e.g., reacted out primarily through the vertical side walls of the stationary frame 110. However, while the display system 100 is in the open configuration (refer to FIG. 2) the tension on the display screen 150 is provided by the weight of the multi-segmented bottom member 140 hanging from the display screen 150. Hence, the display screen 150 can be tensioned to a greater extent while the display system 100 is in the closed configuration as compared to the open configuration.

In the depicted embodiment, the display screen 150 is not horizontally tensioned between the side members 136 and 138 of the peripheral frame 132. Instead, the display screen 150 is free to thermally expand/retract horizontally without binding or resistance because the slots (e.g., slot 137 shown in FIG. 6) defined by side members 136 and 138 provide clearance for the edge portions of the display screen 150 to move within. Alternatively, in some embodiments the display screen 150 is horizontally tensioned, e.g., between the side members 136 and 138 of the peripheral frame 132.

The amount of tension exerted on the display screen 150 can be adjusted by adjusting the amount that the compression springs 366 are compressed. In some embodiments, there are at least two ways in which the compression of the compression springs 366 can be adjusted. First, the compression of each individual compression spring 366 can be individually adjusted by turning the threaded nut 368 to move the nut 368 along the longitudinal axis of the plunger rod 364. Second, all of the compression springs 366 of all the lower display screen hangers 360 coupled in common to a single segment of the multi-segmented bottom member 140 can be adjusted in unison by translating the segment vertically in relation to the top member 134. As described further below, an entire segment of the multi-segmented bottom member 140 can be vertically translated using mechanisms that adjustably couple the segment to the stationary frame 110. Each of the segments of the multi-segmented bottom member 140 can be vertically translated individually (i.e., independently from other segments of the multi-segmented bottom member 140).

Figure 9:
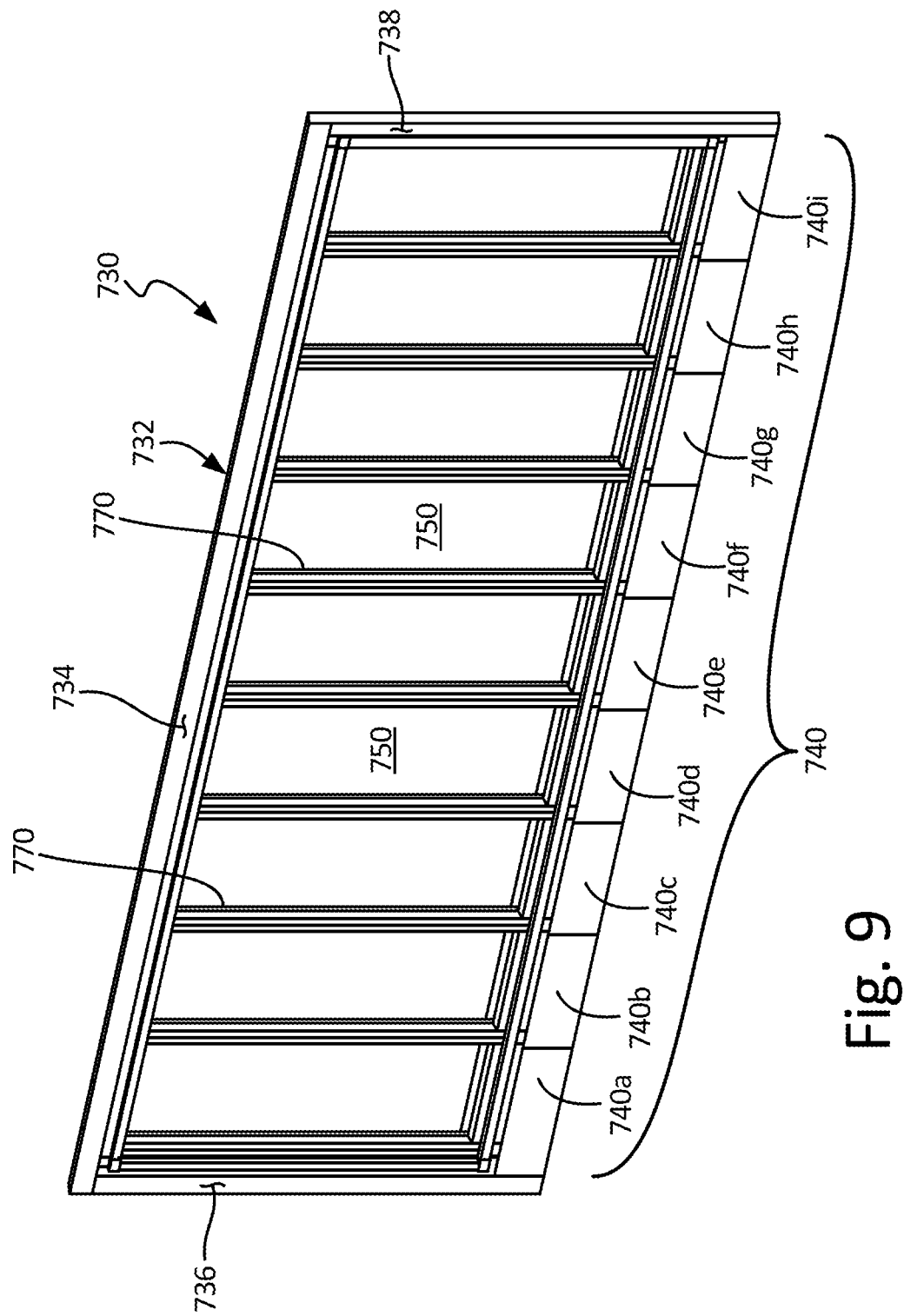
FIG. 9 is a perspective view of an example screen assembly of a large format display system in accordance with some embodiments.

FIG. 9 illustrates another example screen assembly 730. The screen assembly 730 includes a peripheral frame 732, a display screen 750, and multiple vertical struts 770. The multiple vertical struts 770 are positioned behind the display screen 750 (which is shown transparently). The screen assembly 730 is designed to be attached to a stationary frame (not shown) in the manner described above in reference to display system 100.

The peripheral frame 732 includes a top member 734, a first side member 736, a second side member 738, and a multi-segmented bottom member 740. In the depicted embodiment, the multi-segmented bottom member 740 includes nine bottom member segments 740*a*, 740*b*, 740*c*, 740*d*, 740*e*, 740*f*, 740*g*, 740*h*, and 740*i* (also referred to hereafter as bottom member segments 740*a-i*"). Each of the bottom member segments 740*a-i* is mechanically free to individually and independently translate vertically in relation to top member 734.

The multiple vertical struts 770 extend between the top member 734 and the multi-segmented bottom member 740. One purpose of the vertical struts 770 is to structurally support the bottom member segments 740*a-i*. The multiple vertical struts 770 are fixedly coupled to the top member 734, and movably coupled to adjacent pairs of the bottom member segments 740*a-i*. A vertical strut 770 is located at each location where the sides of adjacent bottom member segments 740*a-i* are located. For example, a first vertical strut 770 is located at the adjacent sides of the bottom member segments 740*a* and 740*b*; a second vertical strut 770 is located at the adjacent sides of the bottom member segments 740*b* and 740*c*; and so on.

Figure 10:
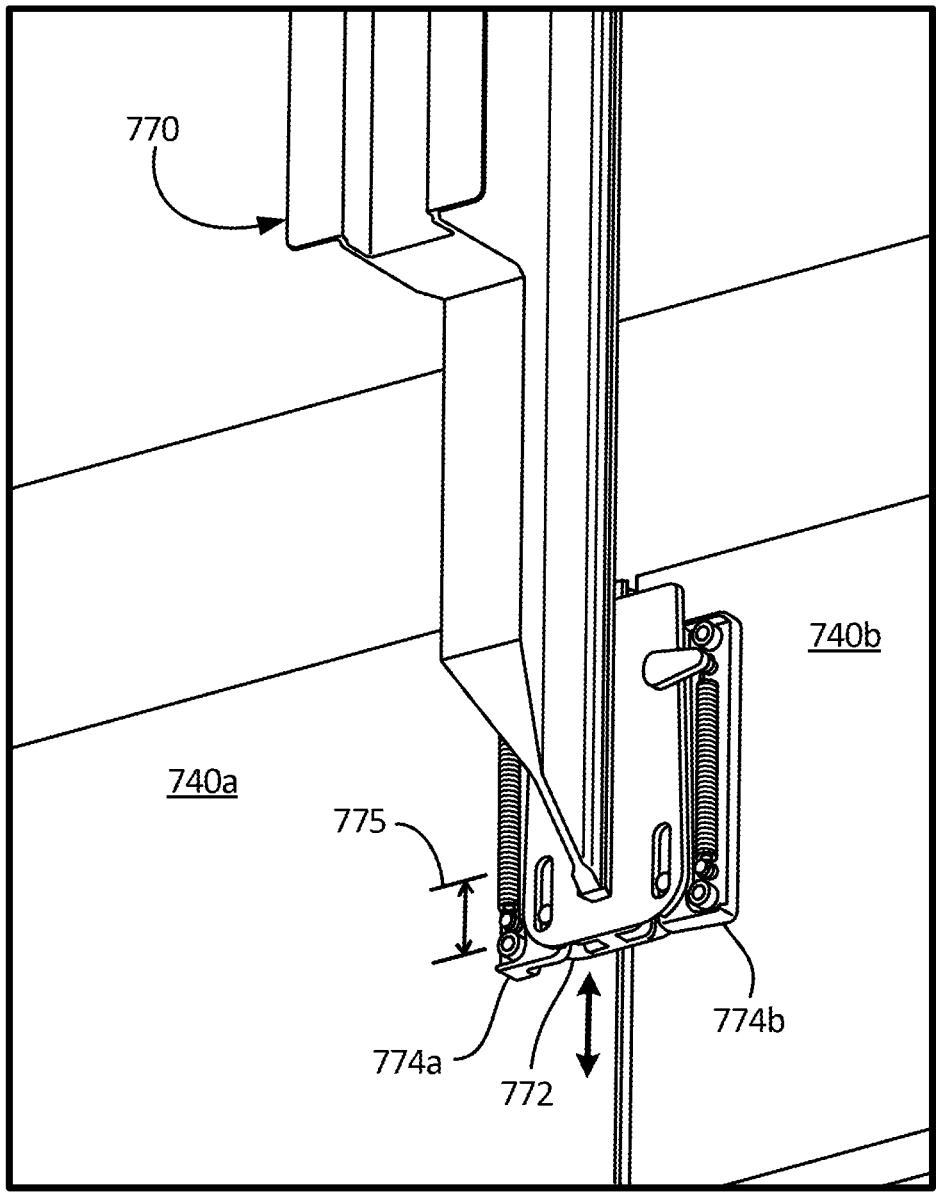
FIG. 10 is a perspective view of the rear side of a bottom portion of an example screen assembly frame showing an example mechanism that facilitates segmented portions of the bottom frame to be individually movable relative to other segmented portions of the bottom frame.

FIG. 10 shows a portion of the rear side of the multi-segmented bottom member 740. In particular, the location where the adjacent sides of bottom member segments 740*a* and 740*b* are located is shown. The bottom portion of a vertical strut 770 is also visible, along with the bracketry by which the vertical strut 770 is movably coupled to the bottom member segments 740*a* and 740*b*. The depicted arrangement is representative of all of the locations where the sides of adjacent bottom member segments 740*a-i* and vertical struts 770 are located.

The lower end of the vertical strut 770 terminates at a strut plate 772 that is fixedly coupled to the other portions of the vertical strut 770. The strut plate 772 is movably coupled with: (i) a first movable plate 774*a* that is fixedly coupled to the bottom member segment 740*a* and (ii) a second movable plate 774*b* that is fixedly coupled to the bottom member segment 740*b*. The movable plates 774*a* and 774*b* can vertically translate (independently of each other) in relation to the stationary strut plate 772. The range of motion 775 of the first movable plate 774*a* in relation to the vertical strut 770 is shown. The second movable plate 774*b* has substantially the same range of motion 775. The left edge portion of bottom member segment 740*a* and the right edge portion of bottom member segment 740*i* (FIG. 9) are movably coupled to the lower portion of the first side member 736 and the lower portion of the second side member 738, respectively, in a similar fashion. Therefore, each of the bottom member segments 740*a-i* is independently translatable in relation to the top member 734.

Figure 11:
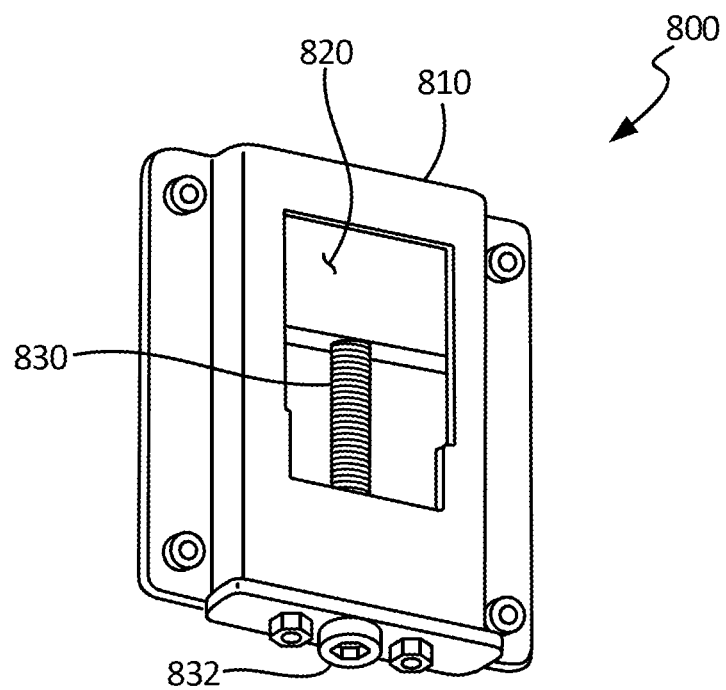
FIG. 11 is a perspective view of an example tensioner that can be used with the large format display systems described herein.

FIG. 11 shows an example tensioner 800 that can be used with the display systems described herein. In one such example, multiple tensioners 800 can be installed on the stationary frame 110 (refer to FIG. 2) such that the bottom member segments 140*a*-140*e* (or 740*a*-740*i*) can be coupled/anchored to the stationary frame 110 and such that the display screen 150 can be tensioned.

As shown in FIG. 2, in some embodiments a plurality of tensioners 800 are fixedly mounted to the stationary frame 110 in locations such that each end of each bottom member segment 140*a*-140*e* (or 740*a*-740*i*) is releasably coupleable to a tensioner 800.

The tensioner 800 includes a housing 810, a movable wedge member 820, a threaded rod 830, and an engageable member 832. The threaded rod 830 is in threaded engagement with the movable wedge member 820. Rotation of the threaded rod 830 causes the movable wedge member 820 to translate vertically within the housing 810. The engageable member 832 is fixedly attached at an end of the threaded rod 830, e.g., outside the housing 810.

The engageable member 832 can be a socket, a hex head, and the like, that is configured to be releasably engaged by a driving member such as a rotary drill motor and the like. When driven in rotation via the engageable member 832, the threaded rod 830 turns about its longitudinal axis in relation to the movable wedge member 820. Since the housing 810 constrains the movable wedge member 820 from rotating along with the threaded rod 830, instead the movable wedge member 820 translates along the longitudinal axis of the threaded rod 830. Put simply, by rotating the engageable member 832, the movable wedge member 820 can be driven upward and/or downward within the housing 810.

Figure 12:
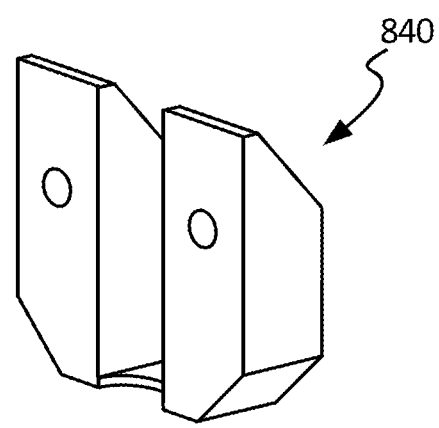
FIG. 12 is a perspective view of an example coupling member that can engage with the tensioner of FIG. 11.

FIG. 12 shows an example coupling member 840 that can releasably engage with the tensioner 800. In particular, a portion of the coupling member 840 can be releasably received within the internal space defined by the housing 810 such that the movable wedge member 820 can abut against the coupling member 840. For example, as the movable wedge member 820 is translated downward within the housing 810 (as described above), the movable wedge member 820 can press against the coupling member 840 and can drive the coupling member 840 downward. In addition to driving the coupling member 840 downward, whatever the coupling member is attached to will also be driven downward.

Figure 13A:
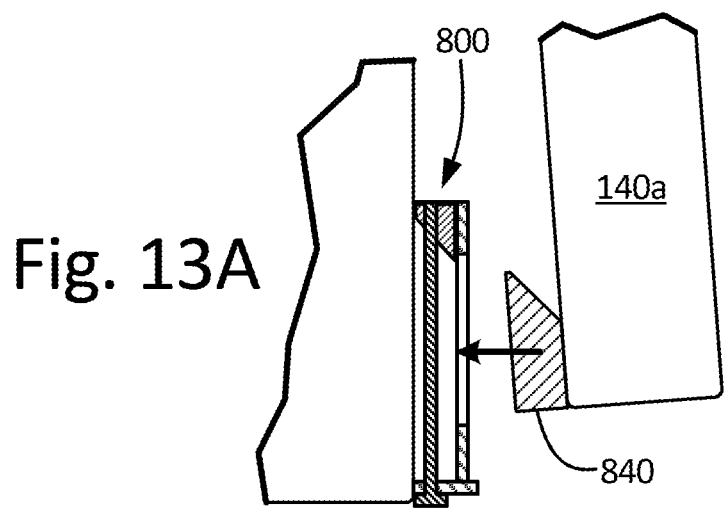
FIGS. 13A-13C are a series of illustrations showing a coupling and tensioning process using the tensioner of FIG. 11 with the coupling member of FIG. 12.
Figure 13B:
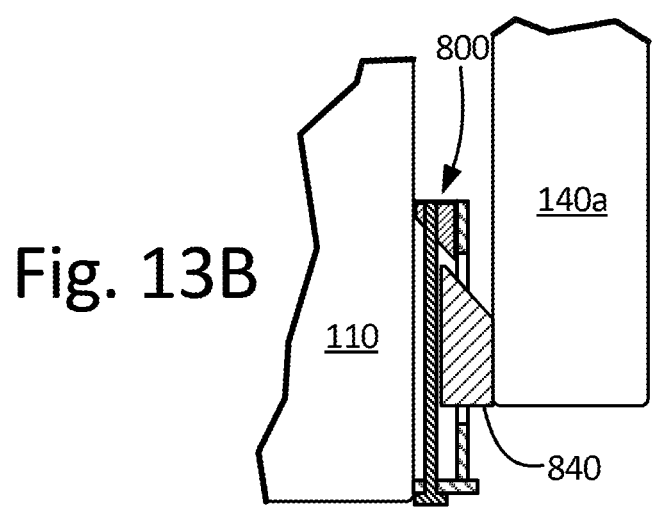
Figure 13C:
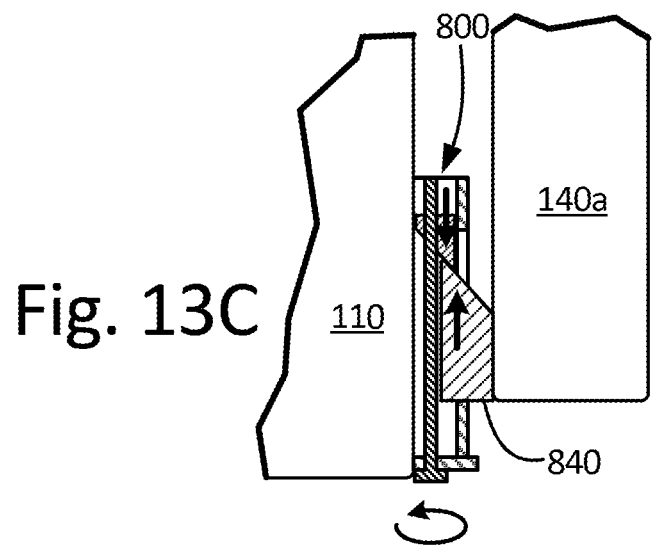

FIGS. 13A-13C show the process of coupling the coupling member 840 with the tensioner 800. In this representative example, the tensioner 800 is fixedly coupled to the stationary frame 110 (refer to FIG. 2 which shows a plurality of such tensioners 800) and the coupling member 840 is fixedly coupled to an end of the bottom member segment 140a. It should be understood that, in some embodiments, a plurality of these arrangements are present on each segment of the multi-segmented bottom members of the screen assemblies described herein (e.g., refer to multi-segmented bottom member 140 and multi-segmented bottom member 740).

FIG. 13A shows a configuration in which the coupling member 840 is spaced away from the tensioner 800. Moreover, the bottom member segment 140a is spaced away from the stationary frame 110. This is representative of an open configuration (e.g., refer to FIG. 2). In such a configuration the tension of the display screen 150 is solely carried or counteracted by the peripheral frame 132.

FIG. 13B shows a closed configuration in which the coupling member 840 is in position to be engaged by the tensioner 800, but before the coupling member 840 is so engaged (i.e., before the coupling member 840 is driven downward by the tensioner 800). While this configuration is closed in that the bottom member segment 140a is in a close position with the stationary frame 110, since the bottom member segment 140a has not been driven downward by the tensioner 800, this configuration is not what is referred to herein as the closed and tensioned configuration. In the closed and tensioned configuration, the tensioner 800 has translated the coupling member 840 and the corresponding bottom member segment 140a downward, resulting in tension added to the display screen 150.

FIG. 13C shows a configuration in which the coupling member 840 is engaged by the tensioner 800 such that the coupling member 840 (and the bottom member segment 140a) has been driven downward by the tensioner 800. This corresponds to the closed and tensioned configuration (refer also to FIG. 1). In this configuration, the tensioner 800 has driven the coupling member 840 and the corresponding bottom member segment 140a downward, resulting in additional tension applied to the display screen 150. It can be understood, therefore, that the tension on the display screen 150 in the closed configuration is carried, counteracted, or anchored by the stationary frame 110 through the top member 134 and the multi-segmented bottom member 140.

While in the depicted embodiment the tensioner 800 is attached to the stationary frame 110 and the coupling member 840 is attached to the movable peripheral frame 132, in some embodiments the reverse is true. That is, in some embodiments the tensioner 800 is attached to the movable peripheral frame 132 and the coupling member 840 is attached to the stationary frame 110.

Figure 14:
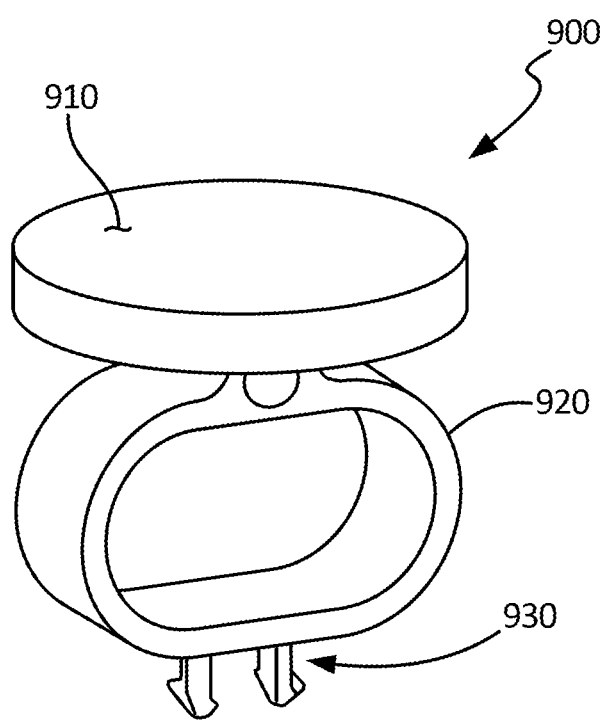
FIG. 14 is a perspective view of an example elastic bumper that can be used in conjunction with some screen assemblies to center locate the display screen into a desired position relative to the peripheral frame of the screen assembly.

FIG. 14 shows an example elastic bumper 900 that can be used in conjunction with some screen assemblies to locate the display screen in a desired position relative to the peripheral frame of the screen assembly. The elastic bumper 900 includes a planar face 910, an elastic portion 920, and a coupling portion 930. In some embodiments, the elastic bumper 900 is a molded thermoplastic that is flexible.

The elastic bumper 900 accommodates manufacturing variability in the thickness of the display screen 150 and variation in tolerances of the interfacing parts. Also, the elastic bumper 900 provides a lower friction surface for the display screen 150 to slide on during a thermal expansion event.

Figure 15:
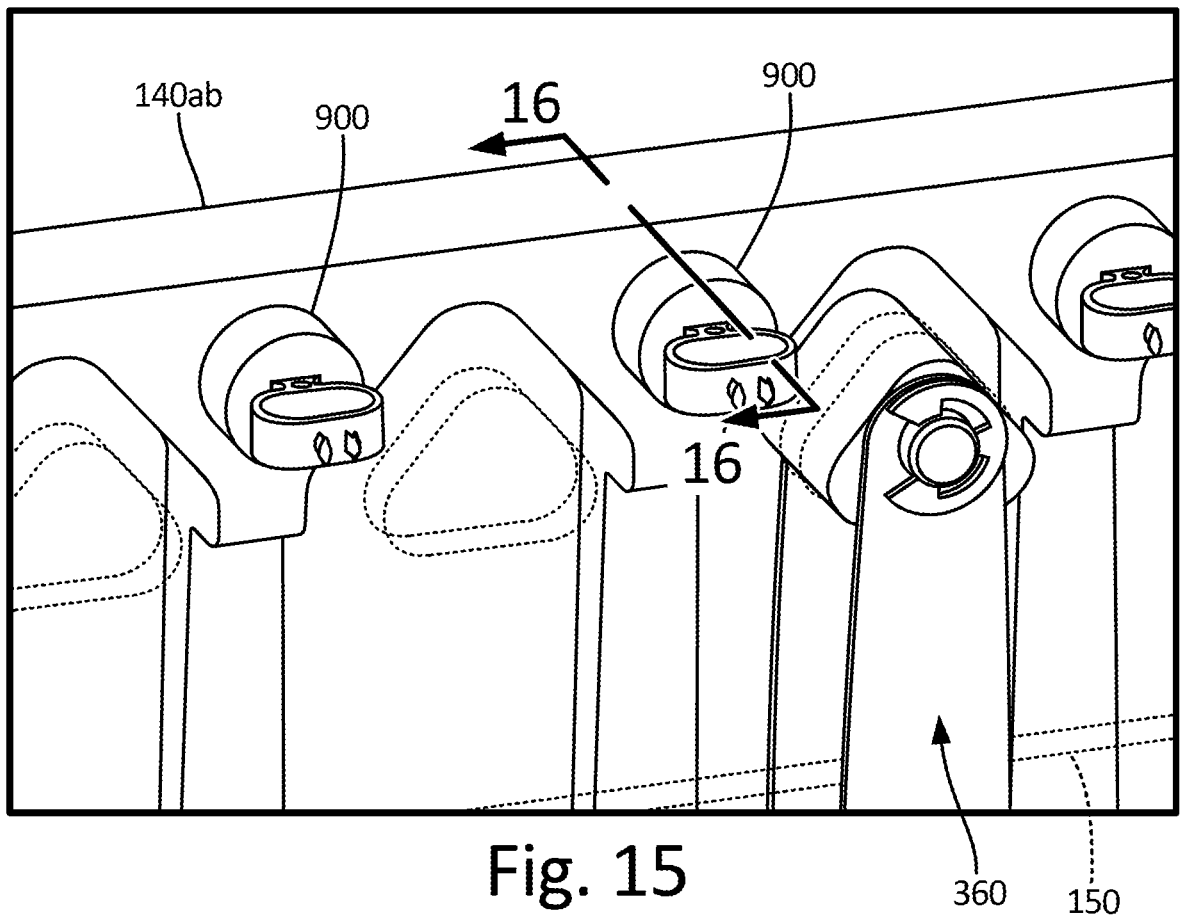
FIG. 15 is a perspective cutaway view of a bottom portion of an example screen assembly showing the elastic bumpers of FIG. 14 in relation to a display screen.
Figure 16:
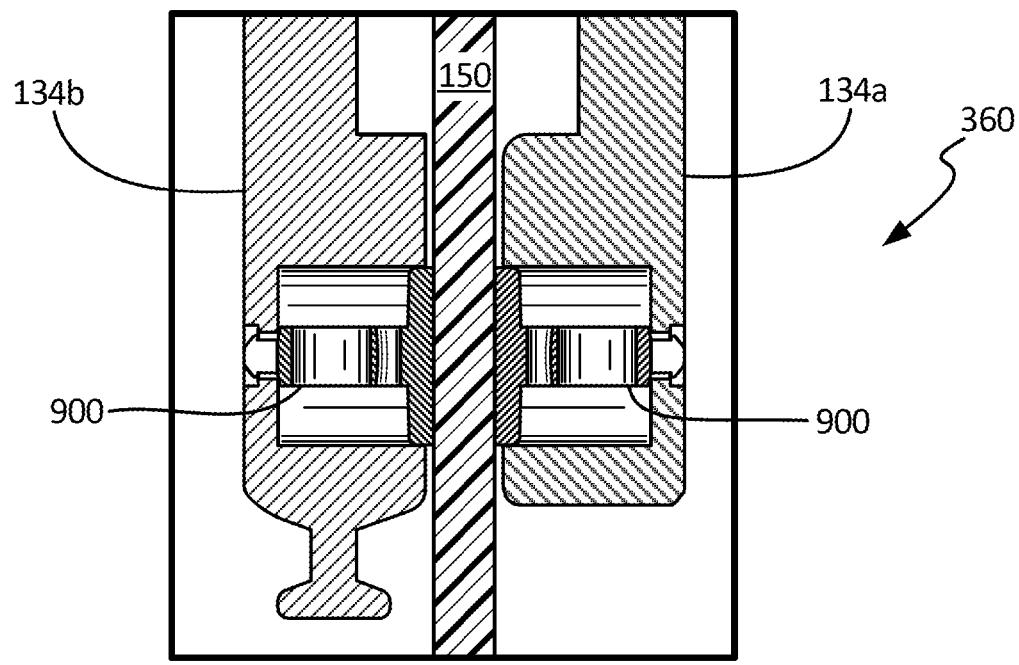
FIG. 16 is a cross-sectional view of FIG. 15 showing opposing elastic bumpers with a display screen positioned between the opposing elastic bumpers.

Referring also to FIGS. 15 and 16, in some embodiments a plurality of elastic bumpers 900 are used to locate and maintain the display screen 150 in a substantially centered position (along the axis perpendicular to the plane of the display screen) within the slots defined by peripheral frame of the screen assembly. The slots are, as described above in reference to display system 100 for example, defined by the peripheral frame 132. A plurality of elastic bumpers 900 are mounted to each of the front and rear portions of the multi-segmented bottom members (such as the rear bottom member segment 140ab shown in FIG. 15). In addition, a plurality of elastic bumpers 900 are mounted to the front and rear portions of the top member 134a and 134b respectively. Further, a plurality of elastic bumpers 900 are similarly mounted to the front and rear portions of the first and second side members of the display screen 150.

The action by the elastic bumpers 900 of centering the edge portions of the display screen 150 within the slots of the screen assembly's peripheral frame results in enhanced structural rigidity of the display screen 150. That is the case because centering the display screen 150 within the slots minimizes the free play between the display screen 150 and the walls that define the slots. Hence, when a user presses on the display screen 150 (in reference to touchscreen implementations, for example) the user experiences a tactilely firm feeling touchscreen. In fact, when the user presses on the display screen 150, the edge portion of the display screen 150 that is within the slot makes contact with both the front and rear portions of the peripheral frame member (e.g., top members 134a and 134b as shown in FIG. 16). When such contact is made, the display screen 150 is structurally rigidized. Because the elastic bumpers 900 center the edge portions of the display screen 150 within the slots of the screen assembly's peripheral frame, the added rigidity is attained with a minimum amount of pre-movement of the display screen 150 within the slot.

Figure 17:
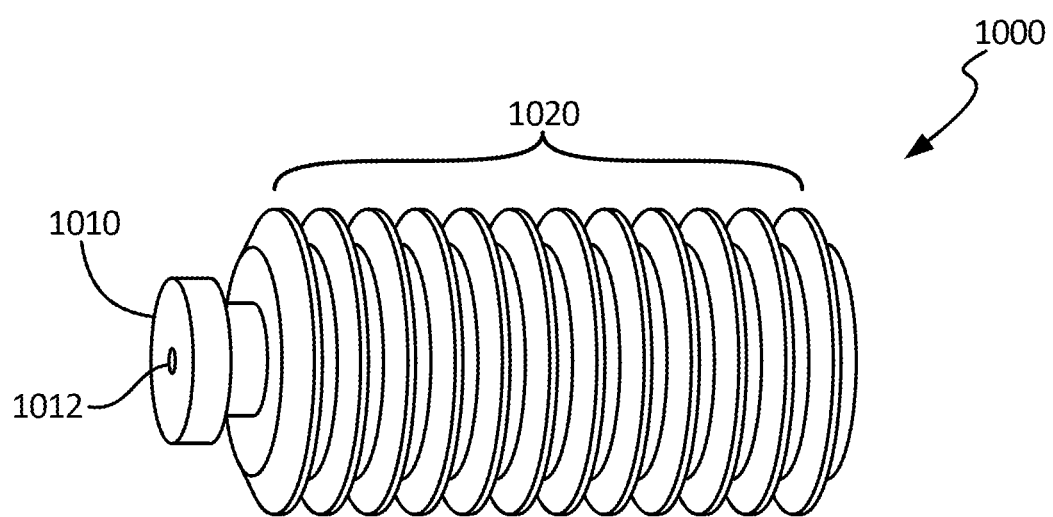
FIG. 17 is a perspective view of an example damper that can be used in conjunction with some screen assemblies to facilitate stability of the display screen.
Figure 18:
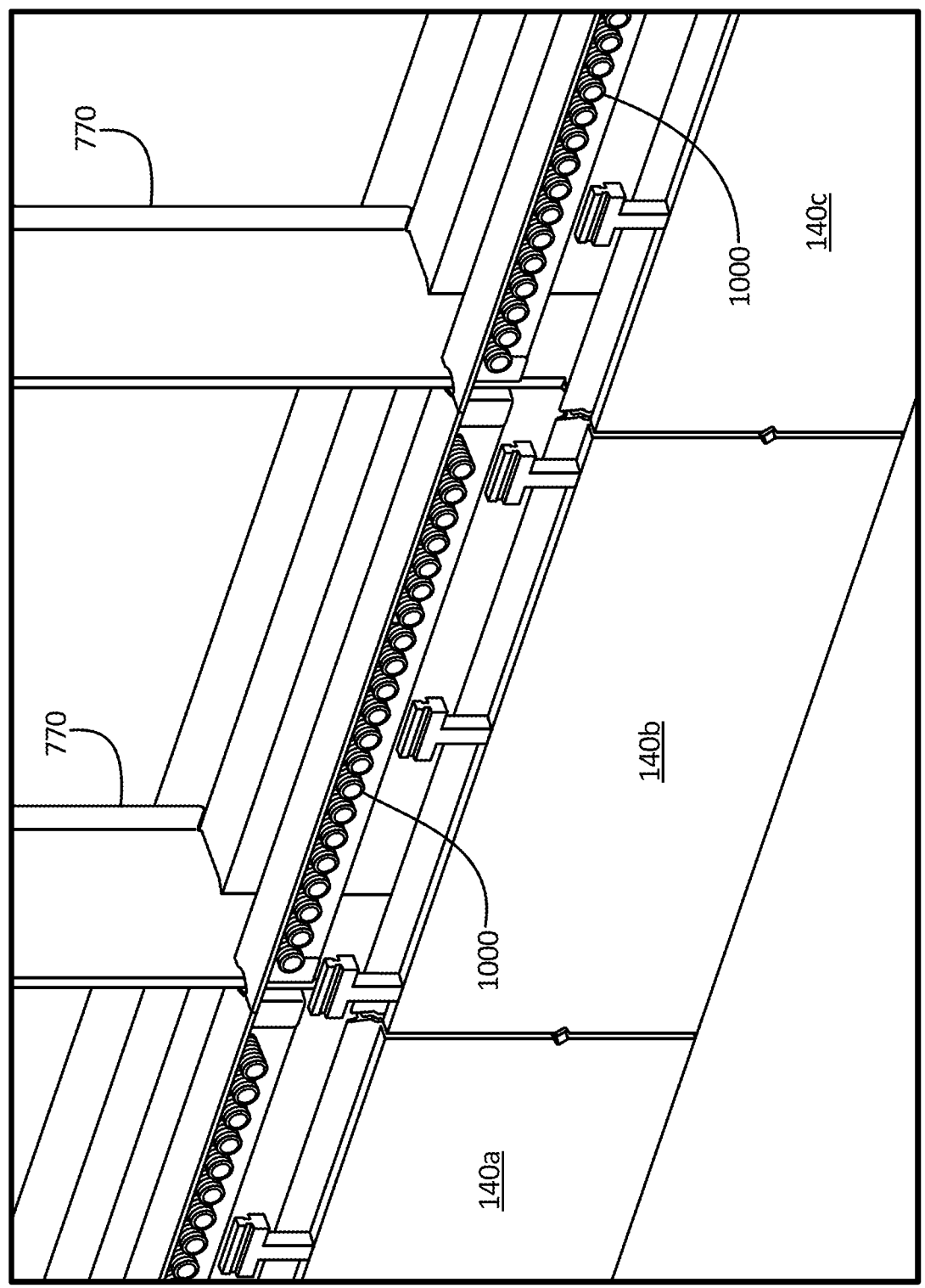
FIG. 18 is a perspective cutaway view of a bottom portion of an example screen assembly showing the shock absorbers of FIG. 17 mounted to the peripheral frame of the screen assembly.

Referring to FIGS. 17 and 18, dampers 1000 can be added to any portion of the peripheral frame (i.e., behind the display screen along the top and bottom of the display screen, and also along the sides of the display screen) as desired to provide an enhanced tactile feel (in reference to touchscreen implementations, for example). Example damper 1000 includes a planar face 1010, a longitudinally-elastic bellows 1020, and an orifice 1012. Air is contained within the bellows 1020 and exits the bellows 1020 through the orifice 1012 when the damper 1000 is longitudinally compressed (such as by compression from the display screen when the display screen is touched by a user). The air escaping from the orifice 1012, when the bellows 1020 is compressed (along with the air entering the orifice 1012) flows at a limited speed determined by the size of the orifice 1012, thereby allowing the screen edge pressed against the damper 1000 to be restricted in its vibration as the damper 1000 dampens the movement. The use of dampers 1000 as depicted provides the user with a tactilely firm-feeling touchscreen experience, while also minimizing vibration.

While this patent application contains many specifics, these should not be construed as limitations on the scope of an invention or of what may be claimed, but rather as descriptions of features specific to particular embodiments of the invention. Certain features that are described in this patent application in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this patent application. For example, while the inventive concepts provided herein are described in reference to a flat-screen implementation, it should be understood that the same concepts can be applied in the context of a curved-screen implementation.

What is claimed is:

1. A display system comprising:
a support to hold one or more imaging engines;
a screen assembly comprising a display screen mounted within a frame and positionable to receive and display images projected from the one or more imaging engines, the display screen having first and second edges on opposite sides of the display screen,
wherein the display screen is mounted within the frame by: (i) a fixed display screen hanger that fixedly couples a first portion of the first edge relative to the frame such that the first portion is restrained from moving along an axis parallel to the first edge, and (ii) a plurality of movable display screen hangers that movably couple a plurality of portions of the first edge relative to the frame such that the plurality of portions are movable along the axis parallel to the first edge; and
a plurality of triangular peg members with which the plurality of movable display screen hangers interface with the display screen, wherein each of the triangular pegs is rotatably coupled with a respective one of the movable display screen hangers.

2. The display system of claim 1, wherein the first portion is centered along the first edge of the display screen.

3. The display system of claim 2, wherein the plurality of portions of the first edge that are movably coupled to the frame by the plurality of movable display screen hangers are positioned on both sides of the fixed display screen hanger.

4. The display system of claim 1, wherein the first portion is offset of a center of the first edge of the display screen.

5. The display system of claim 4, wherein the plurality of portions of the first edge that are movably coupled to the frame by the plurality of movable display screen hangers are all positioned on one side of the fixed display screen hanger.

6. The display system of claim 1, wherein the screen assembly is pivotably coupled to the support.

7. The display system of claim 1, wherein the frame defines a peripheral slot within which edge portions around an entire periphery of the display screen are disposed.

8. The display system of claim 7, wherein there is dimensional clearance between the edge portions around an entire periphery of the display screen and the peripheral slot.

9. The display system of claim 1, wherein the display screen includes a third edge and a fourth edge extending perpendicular to the first edge and the second edge,
wherein the display screen is coupled to the frame along the first edge and the second edge, and
wherein the display screen is not coupled to the frame along the third edge and the fourth edge.

10. The display system of claim 1, wherein the second edge is coupled to the frame by a plurality of second hangers.

11. The display system of claim 10, wherein each second hanger includes a spring to apply tension to the display screen.

12. The display system of claim 1, further comprising a plurality of dampers attached to the frame and in contact with the display screen.

13. The display system of claim 1, wherein the frame defines a peripheral slot within which the edge portions of the display screen are disposed, and wherein a plurality of elastic bumpers mounted to the frame contact the edge portions of the display screen to center the edge portions of the display screen within the peripheral slot.

14. The display system of claim 1, wherein each of the elastic bumpers includes a planar face that contacts the edge portions of the display screen.

15. The display system of claim 1, wherein each of the triangular pegs is engaged within a triangular opening defined through the display screen.

16. The display system of claim 1, wherein each of the movable display screen hangers includes one or more bearings that movably couple the plurality of movable display screen hangers with the frame.

17. The display system of claim 16, wherein the one or more bearings are arranged to roll along the frame in response to thermal expansion of the display screen.

18. A display system comprising:
one or more imaging engines, each imaging engine configured to emit a scanning light beam;
a support holding the one or more imaging engines;
a screen assembly coupled to the support and comprising a display screen mounted within a frame that defines a peripheral slot, the display screen positionable to receive and display images projected from the one or more imaging engines, the display screen comprising three different color phosphors and having first and second edges on opposite sides of the display screen,
wherein the display screen is mounted within the frame by: (i) a fixed display screen hanger that fixedly couples a first portion of the first edge relative to the frame such that the first portion is restrained from moving along an axis parallel to the first edge, and (ii) a plurality of movable display screen hangers that movably couple a plurality of portions of the first edge relative to the frame such that the plurality of portions are movable along the axis parallel to the first edge, each of the movable display screen hangers including one or more bearings arranged to roll along the frame in response to thermal expansion of the display screen; and
a plurality of triangular peg members with which the plurality of movable display screen hangers interface with the display screen, wherein each of the triangular pegs is rotatably coupled with a respective one of the movable display screen hangers.

\* \* \* \* \*